US011880155B2

(12) United States Patent
Maeda

(10) Patent No.: US 11,880,155 B2
(45) Date of Patent: Jan. 23, 2024

(54) IMAGE FORMING APPARATUS, TRANSFER DEVICE, AND STORAGE MEDIUM

(71) Applicant: Katsuhiko Maeda, Kanagawa (JP)

(72) Inventor: Katsuhiko Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/973,460

(22) Filed: Oct. 25, 2022

(65) Prior Publication Data

US 2023/0161285 A1 May 25, 2023

(30) Foreign Application Priority Data

Nov. 25, 2021 (JP) ................................ 2021-191075
Sep. 28, 2022 (JP) ................................ 2022-154792

(51) Int. Cl.
*G03G 15/16* (2006.01)
*G03G 15/00* (2006.01)
*G03G 15/01* (2006.01)

(52) U.S. Cl.
CPC ..... *G03G 15/5062* (2013.01); *G03G 15/0131* (2013.01); *G03G 15/1605* (2013.01)

(58) Field of Classification Search
CPC ........... G03G 15/0131; G03G 15/1605; G03G 15/5041; G03G 15/5054; G03G 15/5058; G03G 15/5062
See application file for complete search history.

(56) References Cited

U.S. PATENT DOCUMENTS 6,249,304 B1 6/2001 Sawayama et al.
11,126,108 B2 * 9/2021 Maeda ................. G02B 26/127
2004/0070661 A1 4/2004 Maeda
2004/0095454 A1 5/2004 Maeda
2004/0160506 A1 8/2004 Maeda
2004/0239747 A1 12/2004 Maeda
2005/0163519 A1 * 7/2005 Takahashi .......... G03G 15/5058 399/49
2005/0184229 A1 8/2005 Maeda
2005/0200689 A1 9/2005 Shinohara et al.
2006/0045577 A1 3/2006 Maeda
2006/0176363 A1 8/2006 Maeda
2007/0217831 A1 9/2007 Maeda
2008/0273902 A1 11/2008 Maeda
2011/0228030 A1 9/2011 Maeda
2014/0063168 A1 3/2014 Maeda et al.
2014/0072317 A1 3/2014 Shukuya et al.
2015/0054902 A1 2/2015 Maeda et al.
(Continued)

FOREIGN PATENT DOCUMENTS

JP 8-069146 3/1996
JP 2016-159540 9/2016
JP 2021-039285 3/2021

OTHER PUBLICATIONS

U.S. Appl. No. 17/663,700, filed May 17, 2022, Katsuhiko Maeda.

*Primary Examiner* — Hoang X Ngo
(74) *Attorney, Agent, or Firm* — Duft & Bornsen, PC

(57) ABSTRACT

An image forming device comprising circuitry. The circuitry generates an image pattern in which two or more types of patch images are combined and changes a value of image data around at least one type of patch image of the two or more types of patch images to less than a maximum value of image data of the at least one type of patch image when the two or more types of patch images are combined.

13 Claims, 20 Drawing Sheets

(56) References Cited

U.S. PATENT DOCUMENTS

| | | | |
|---|---|---|---|
| 2015/0316870 A1 | 11/2015 | Maeda | |
| 2016/0131991 A1* | 5/2016 | Yoshida | G03G 15/0862<br>399/49 |
| 2017/0031264 A1 | 2/2017 | Honda et al. | |
| 2018/0267422 A1 | 9/2018 | Maeda | |
| 2019/0163109 A1 | 5/2019 | Maeda | |
| 2021/0063909 A1 | 3/2021 | Maeda | |
| 2022/0187753 A1 | 6/2022 | Maeda | |

* cited by examiner

IMAGE FORMING APPARATUS, TRANSFER DEVICE, AND STORAGE MEDIUM

CROSS-REFERENCE TO RELATED APPLICATIONS

This patent application is based on and claims priority pursuant to 35 U.S.C. § 119(a) to Japanese Patent Application Nos. 2021-191075, filed on Nov. 25, 2021, and 2022-154792, filed on Sep. 28, 2022, in the Japan Patent Office, the entire disclosure of which is hereby incorporated by reference herein.

BACKGROUND

Technical Field

Embodiments of this disclosure relate to an image forming apparatus, a transfer device, and a storage medium.

Related Art

Technologies have been developed that generate an image misregistration correction image for correcting a misregistration of an image or generate and print a check image for checking a state of an image forming apparatus. For example, a technology is known that changes the arrangement of a large number of patch images in a chart image to reduce variations of colorimetric data of the chart image including a combination of various patch images.

SUMMARY

In an embodiment of the present disclosure, there is provided an image forming device that includes circuitry. The circuitry generates an image pattern in which two or more types of patch images are combined and changes a value of image data around at least one type of patch image of the two or more types of patch images to less than a maximum value of image data of the at least one type of patch image when the two or more types of patch images are combined.

In another embodiment of the present disclosure, there is provided an image forming device that includes circuitry. The circuitry generates an image pattern in which two or more types of patch images are combined and reverses black and white of at least one type of patch image of the two or more types of patch images when the two or more types of patch images are combined.

In still another embodiment of the present disclosure, there is provided a non-transitory storage medium storing a plurality of instructions which, when executed by one or more processors, cause the processors to execute a method. The method includes generating an image pattern in which two or more types of patch images are combined and changing a value of image data around at least one type of patch image of the two or more types of patch images to less than a maximum value of the at least one type of patch image when the two or more types of patch images are combined.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
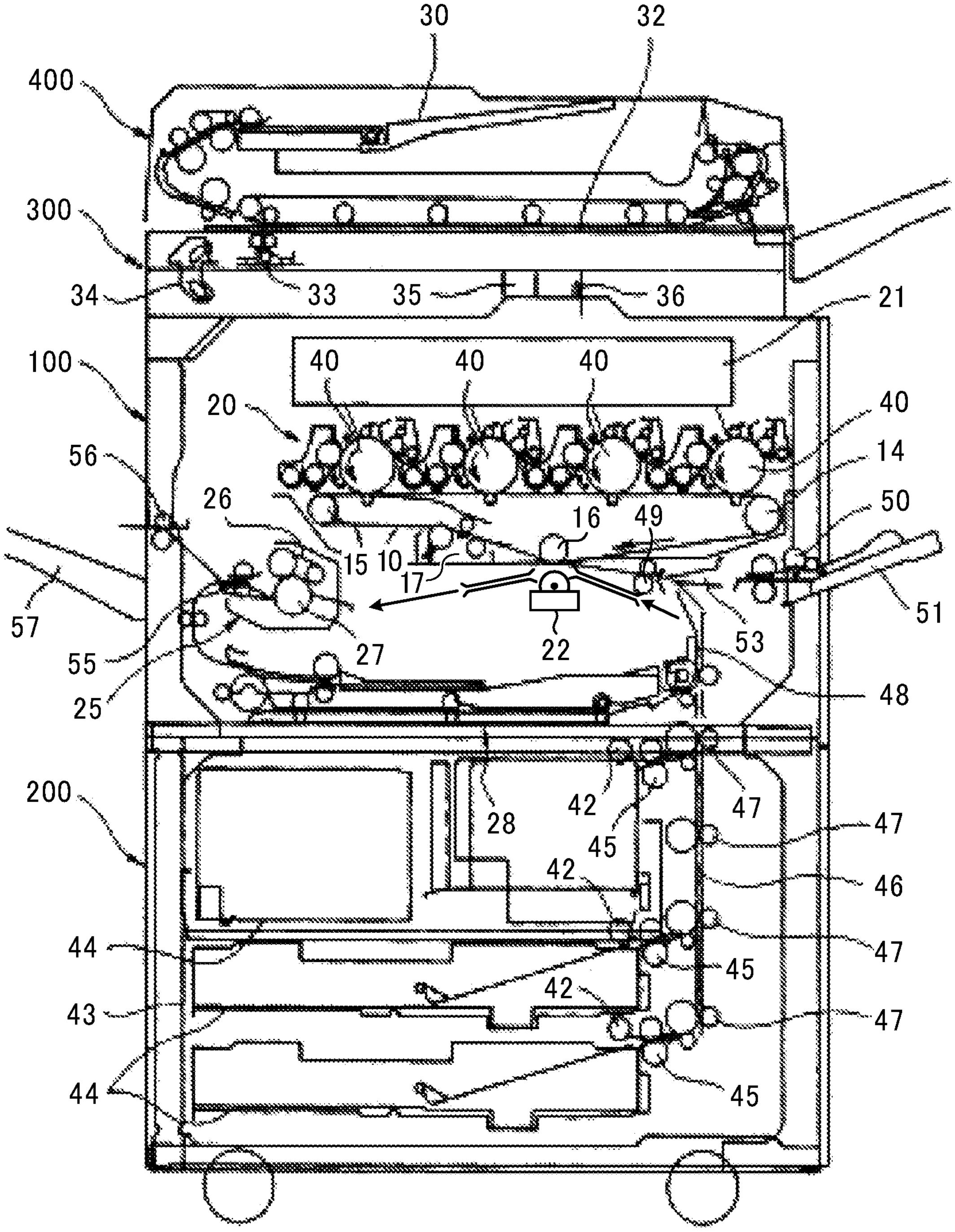
FIG. 1 is a schematic view of a printer of an image forming apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

First Embodiment

FIG. 1 is schematic view of a printer of an image forming apparatus, according to a first embodiment of the present disclosure. A printer 100 (an example of the transfer device) of the image forming apparatus according to the present embodiment includes an intermediate transfer unit in the middle of the printer 100. The intermediate transfer unit is provided with an intermediate transfer belt 10 that is an endless belt. The intermediate transfer belt 10 is wound around three support rollers 14 to 16 and is driven to rotate in a clockwise direction indicated by an arrow in FIG. 1. An intermediate transferor cleaner 17 that removes residual toner remaining on the intermediate transfer belt 10 after image transfer is disposed at the right side of a second support roller 15.

An image forming device 20 is provided with the intermediate transfer belt 10 between the first support roller 14 and the second support roller 15. The image forming device 20 includes photoconductor units 40, charging units, developing units, and cleaning units. The photoconductor units 40 for respective colors of yellow (Y), magenta (M), cyan (C), and black (K) are disposed along a movement direction of the intermediate transfer belt 10. Each charging unit charges a photoconductor drum disposed in the corresponding one of the photoconductor units 40. Each developing unit (an example of a toner developing unit) develops a latent image formed on the corresponding photoconductor drum by a light beam scanner 21 described below. Each cleaning unit removes toner remaining on the corresponding photoconductor drum. The photoconductor unit 40 functions as an example of a transfer unit that transfers a toner image obtained by developing a latent image by the developing unit onto the intermediate transfer belt 10 (an example of a transferor). The image forming device 20 is detachably attached to a body of the printer 100.

The light beam scanner 21 is disposed above the image forming device 20 and irradiates each photoconductor drum (an example of an image bearer) of the photoconductor unit 40 for each color with laser light for image formation to form the latent image. The light beam scanner 21 functions as an example of an optical writing device that forms the latent image by scanning and irradiating the photoconductor drum with a light beam corresponding to an image pattern. The image pattern is an example of an image pattern in which two or more types of patch images such as an image misregistration correction pattern and an image density adjustment pattern are combined. A secondary transfer unit 22 is disposed below the intermediate transfer belt 10. The secondary transfer unit 22 is disposed to push up the intermediate transfer belt 10 to press the intermediate transfer belt 10 against a third support roller 16. With such a configuration, the toner image on the intermediate transfer belt 10 is transferred onto a sheet. That is, the secondary transfer unit 22 functions as an example of a transfer unit that transfers the toner image formed on the intermediate transfer belt 10 onto the sheet (an example of a transferor). A fixing unit 25 that fixes the toner image transferred onto the sheet is disposed beside the secondary transfer unit 22. The sheet onto which the toner image is transferred is conveyed to the fixing unit 25. A heating pressure roller 27 is pressed against a fixing belt 26 that is an endless belt in the fixing unit 25. A sheet reverse unit 28 is disposed below the secondary transfer unit 22 and the fixing unit 25. The sheet reverse unit 28 reverses the front and back of the sheet immediately after the toner image is formed on the front side and sends out the sheet in order to record the toner image also on the back side.

In a case where a document is on a document feeding table 30 of an automatic document feeder (ADF) 400, the document is conveyed onto an exposure glass 32 when a start switch of an operation unit in the image forming apparatus is pressed. When no document is on the ADF 400, a scanner of an image reading unit 300 is driven to read a document manually placed on the exposure glass 32. Thus, a first carriage 33 and a second carriage 34 are driven to scan and read the document. The light is emitted onto the exposure glass 32 from a light source on the first carriage 33. The reflected light from the document surface is reflected by a first mirror on the first carriage 33 toward the second carriage 34. The light is reflected by the mirror on the second carriage 34 to be imaged on a reading sensor 36 such as a charge-coupled device (CCD) through an imaging lens 35. The printer 100 generates recording data of each color of Y, M, C, and K based on the image signals obtained by the reading sensor 36.

The intermediate transfer belt 10 of the printer 100 starts driving to rotate and preparation for image formation for each of the image forming devices 20 when a start switch is operated, when an image output is instructed from, for example, a personal computer (PC), or when an image output instruction is received through facsimile communication. Next, the printer 100 starts an image forming sequence of each color image and irradiates an exposure laser beam modulated based on recording data for each color onto the photoconductor drum for each color. Thus, the printer 100 superimposes and transfers the toner images of the colors Y, M, C, and K onto the intermediate transfer belt 10 by image forming processes for the colors Y, M, C, and K to form a single toner image on the intermediate transfer belt 10. The printer 100 feeds the sheet to the secondary transfer unit 22 at a timing such that the leading end of the sheet enters the secondary transfer unit 22 at the same time as the leading end of the toner image enters the secondary transfer unit 22. As a result, the printer 100 transfers the toner image on the intermediate transfer belt 10 onto the sheet. The printer 100 conveys the sheet onto which the toner image has been transferred to the fixing unit 25. Thus, the toner image is fixed onto the sheet in the fixing unit 25.

The image forming apparatus selectively drives one of feed rollers 42 of a feed table 200 to rotate. The sheets are fed from one of sheet trays 44 disposed in multiple stages in a sheet feeder unit 43. Thus, one sheet is separated by a separation roller 45 and is conveyed to a conveying roller unit 46. Next, the image forming apparatus guides the sheet to a conveying roller unit 48 in the printer 100 by conveying the sheet by a conveying roller 47, and stops the sheet by causing the sheet to come into contact with a registration roller pair 49 of the conveying roller unit 48. Thus, the image forming apparatus conveys the sheet to the secondary transfer unit 22 at the above-described timing. A user can insert the sheet on a manual sheet tray 51 disposed in the image forming apparatus to feed the sheet. When the user inserts the sheet onto the manual sheet tray 51, the image forming apparatus drives to rotate a feed roller 50 to separate one of the sheets on the manual sheet tray 51, draws the sheet into a manual feed passage 53, and causes the sheet to come into contact with the registration roller pair 49 to stop the sheet.

The image forming apparatus guides the sheet ejected after the fixing process in the fixing unit 25 to an ejection roller 56 by a switching claw 55 and stacks the sheet on a sheet ejection tray 57. The image forming apparatus guides the sheet to the sheet reverse unit 28 by the switching claw 55, reverses the sheet through the sheet reverse unit 28, guides the sheet again to the transfer position, and records an image also on the back surface. Thus, the ejection roller 56 ejects the sheet onto the sheet ejection tray 57. On the other hand, the intermediate transferor cleaner 17 removes the residual toner from the intermediate transfer belt 10 after image transfer to prepare for the next image formation.

Figure 2:
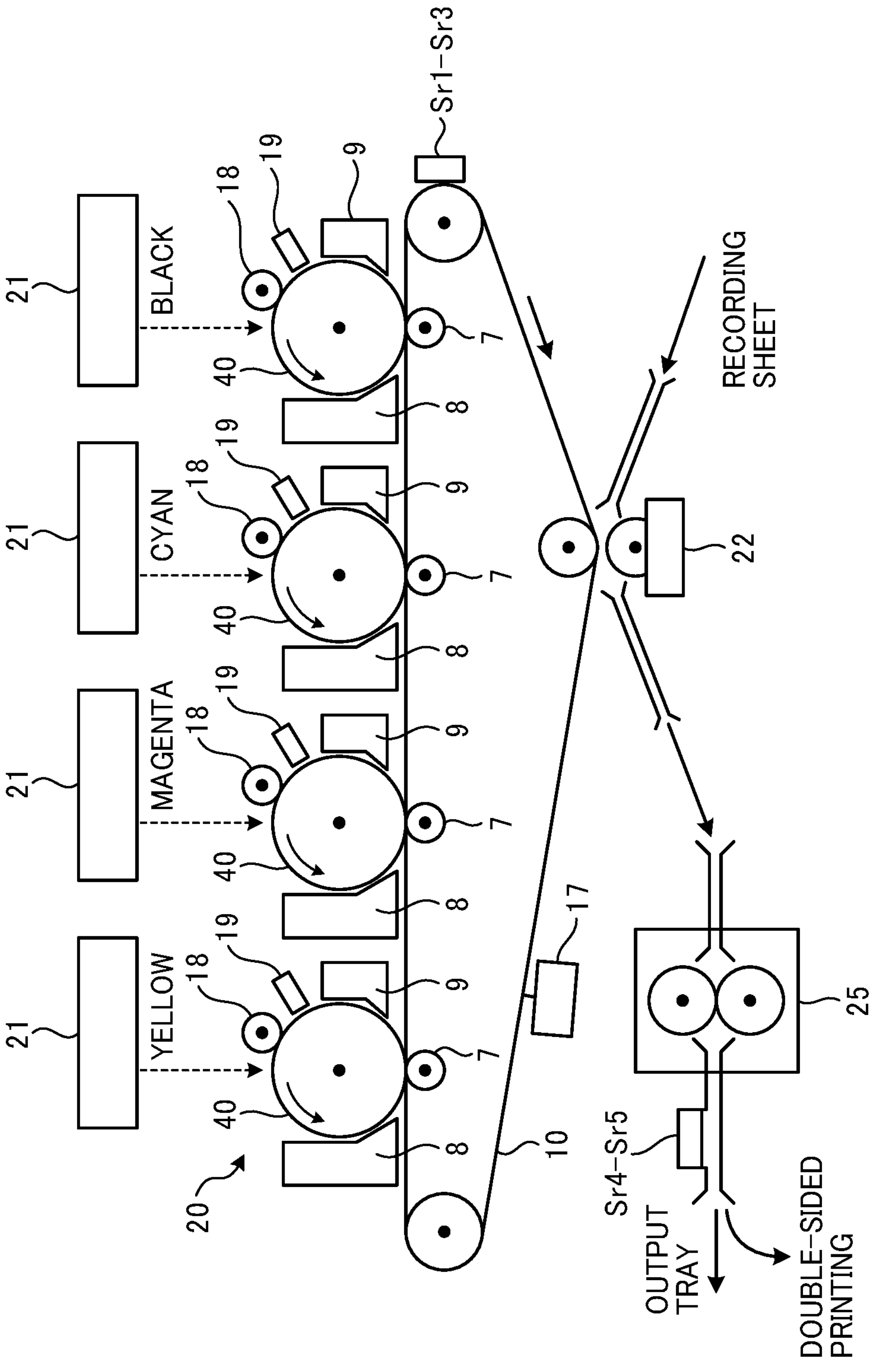
FIG. 2 is a diagram illustrating a configuration of an image forming device disposed in the image forming apparatus according to the first embodiment of the present disclosure.

FIG. 2 is a diagram illustrating an example of a configuration of the image forming device 20 disposed in the image forming apparatus according to the first embodiment of the present disclosure. The image forming device 20 includes four sets of image forming units and four sets of light beam scanners 21 to form color images in which images of four colors of yellow, magenta, cyan, and black are superimposed. The light beam scanner 21 is provided with a laser diode (LD) controller to be described later. The LD controller selectively emits a light beam by driving and modulating the light beam according to image data. The light beam emitted from the light beam scanner 21 is deflected by a polygon mirror rotated by a polygon motor, passes through an f-O lens, is reflected by a return mirror, and scans the photoconductor drum.

The image forming device 20 includes a charger 18, a developing unit 8, a transfer unit 7 (an example of a transfer unit), a cleaning unit 9, and a static eliminator 19 around the photoconductor drum for each color. The transfer unit 7 transfers the toner image formed on the photoconductor drum to the intermediate transfer belt 10 (an example of a transferor). The static eliminator 19 eliminates static electricity from the photoconductor drum. The image forming device 20 forms a first color image on the intermediate transfer belt 10 by charging, exposure, development, and transfer which are ordinary electrophotographic processes, and transfers a second color image, a third color image, and a fourth color image in this order to form a color toner image (color image) in which images of four colors are superimposed.

Further, the image forming device 20 causes the secondary transfer unit 22 to transfer the toner image formed on the intermediate transfer belt 10 onto a conveyed recording sheet (paper), thereby forming a color image in which four color images are superimposed on each other on the recording sheet. The image forming device 20 also includes the intermediate transferor cleaner 17 for removing the toner image on the intermediate transfer belt 10. The image forming device 20 includes sensors sr1 to sr3 for detecting the image pattern (for example, the image misregistration correction pattern or the image density adjustment pattern) formed on the intermediate transfer belt 10. The sensors sr1 to sr3 are reflection-type optical sensors and detect the image pattern formed on the intermediate transfer belt 10. The printer 100 corrects, for example, image misregistrations in the main scanning direction and the sub-scanning direction between the respective colors, an image magnification in the main scanning direction, and the image density based on the detection results of the image pattern by the sensors sr1 to sr3.

Then, the image forming device 20 fixes the image on the recording sheet by a fixing device. The image forming device 20 is disposed near an exit of the fixing device and includes sensors sr4 and sr5 that detect the image pattern formed on the recording sheet (an example of a print medium). The sensors sr4 and sr5 are image reading sensors such as a charge-coupled device (CCD) or a contact image sensor (CIS). The sensors sr4 and sr5 are disposed at positions where the image patterns formed at the four corners on the recording sheet can be detected. The printer 100 executes correction of the image position with respect to the recording sheet, correction of the image position on the back surface with respect to the image position on the front surface, and correction of the image density based on the detection results of the sensors sr4 and sr5. The image forming device 20 includes a toner bottle containing toner to be supplied to the developing unit for each color.

Figure 3:
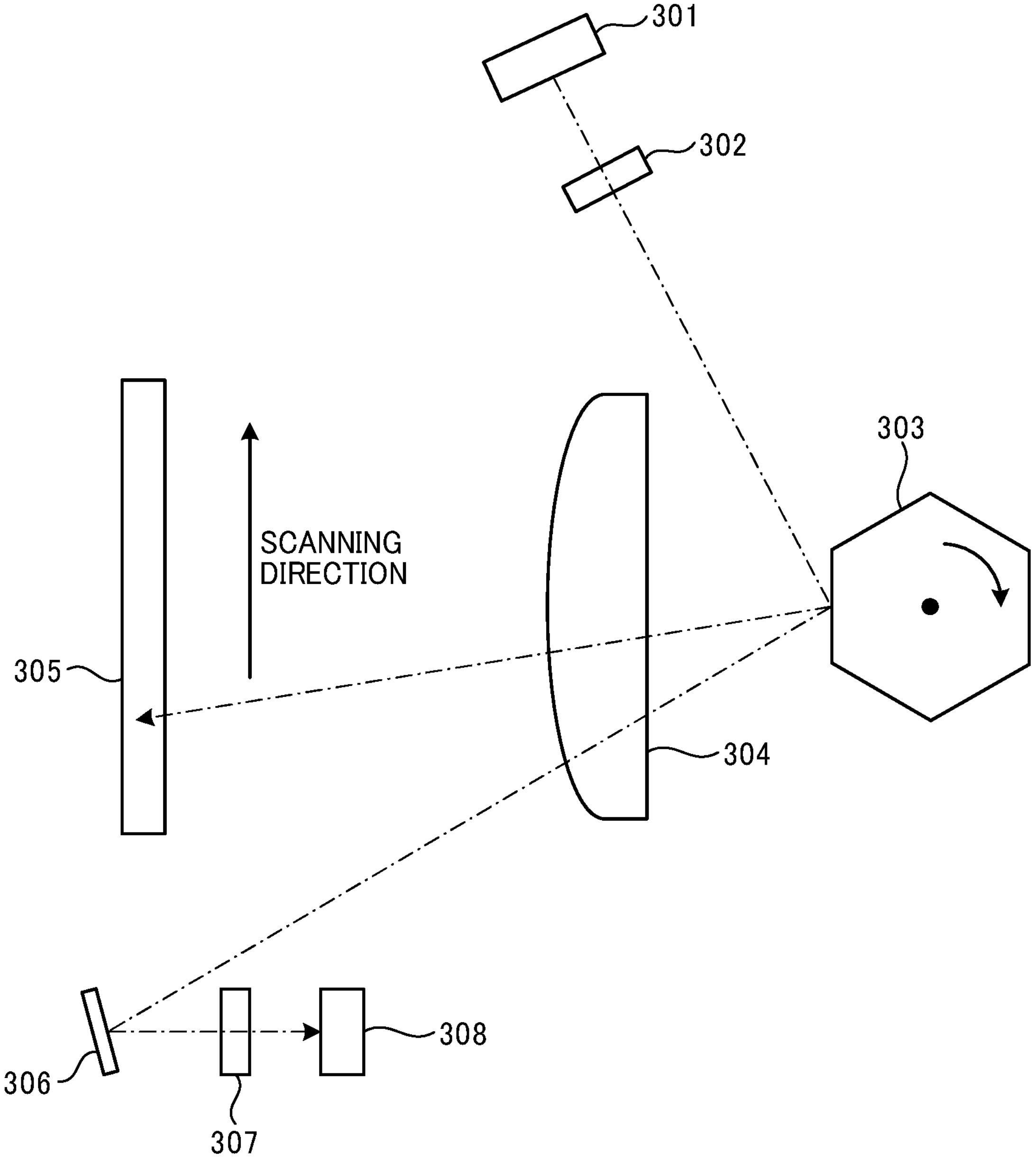
FIG. 3 is a diagram illustrating a configuration of a light beam scanner disposed in the image forming apparatus according to the first embodiment of the present disclosure.

FIG. 3 is a diagram illustrating a configuration of the light beam scanner disposed in the image forming apparatus, according to the first embodiment of the present disclosure. Specifically, FIG. 3 is a top view of the light beam scanner 21. The light beam scanners 21 of the respective colors have the same configuration. In the light beam scanner 21, the light beam from an LD unit passes through a cylinder lens (CYL) 302, is incident on a polygon mirror 303, is deflected by the rotation of the polygon mirror 303, passes through an f-O lens 304, and scans the photoconductor drum by a return mirror 305.

The light beam scanner 21 is provided with a synchronous mirror 306, a synchronous lens 307, and a synchronous sensor 308 at an end portion on the writing side in the main scanning direction of the light beam. The light beam scanner 21 has a configuration that the light beam transmitted through the f-O lens 304 is reflected by the synchronous mirror 306, is condensed by the synchronous lens 307, and enters the synchronous sensor 308. The synchronous sensor 308 functions as a synchronous detection sensor for detecting a synchronous detection signal of determining a writing start timing in the main scanning direction.

Figure 4A:
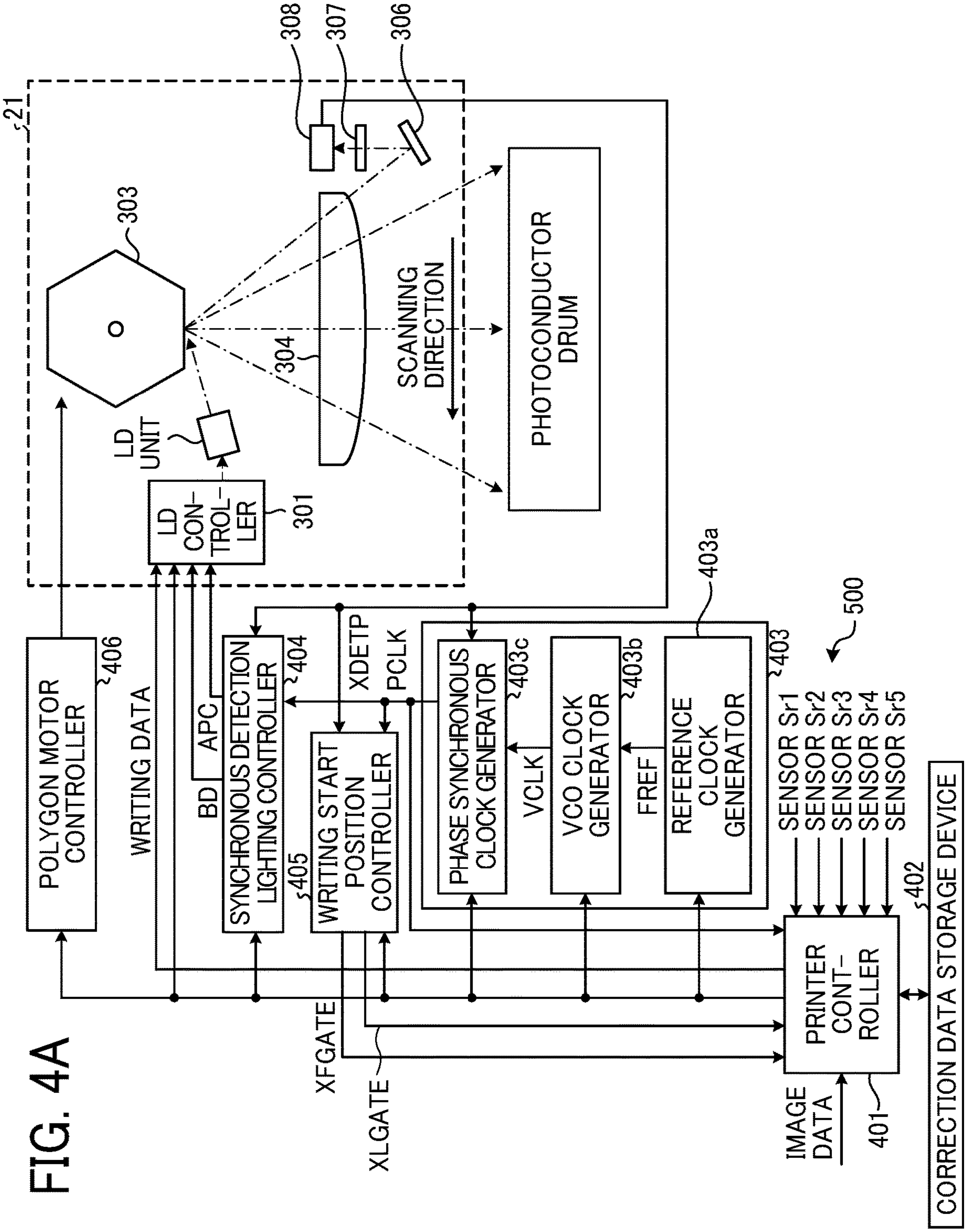
FIG. 4A is a diagram illustrating a configuration of an image forming controller and a light beam scanner disposed in the printer of the image forming apparatus according to the first embodiment of the present disclosure.

FIG. 4A is a diagram illustrating a configuration of an image forming controller and a light beam scanner disposed in the printer, according to the first embodiment of the present disclosure. Although FIG. 4A illustrates an image forming controller 500 and the light beam scanner 21 for one color, the image forming controller 500 and the light beam scanner 21 are disposed for each color, except for a printer controller 401, a correction data storage device 402, and sensors sr1 to sr5.

The light beam scanner 21 is provided with the synchronous sensor 308 which detects a light beam, at an end portion on the writing side in the main scanning direction of the light beam. The light beam scanner 21 has a configuration that the light beam transmitted through the f-Θ lens 304 is reflected by the synchronous mirror 306, is condensed by the synchronous lens 307, and enters the synchronous sensor 308. The light beam passes over the synchronous sensor 308, thereby to output a synchronous detection signal XDETP from the synchronous sensor 308. Thus, the synchronous detection signal XDETP is supplied to a pixel clock generator 403, a synchronous-detection-lighting controller 404, and a writing-start-position controller 405.

The pixel clock generator 403 generates a pixel clock PCLK synchronized with the synchronous detection signal XDETP and supplies the pixel clock PCLK to the writing-start-position controller 405, the synchronous-detection-lighting controller 404, and the printer controller 401.

In order to first detect the synchronous detection signal XDETP, the synchronous-detection-lighting controller 404 turns on an LD forced lighting signal BD to forcibly turn light on the LD unit. On the other hand, after detecting the synchronous detection signal XDETP, the synchronous-detection-lighting controller 404 uses the synchronous detection signal XDETP and the pixel clock PCLK to illuminate the LD unit at a timing at which the synchronous detection signal XDETP can be reliably detected to the extent that flare light is not generated. The synchronous-detection-lighting controller 404 generates the LD forced lighting signal BD that turns off the LD unit when the synchronous detection signal XDETP is detected, and transmits the LD forced lighting signal BD to an LD controller 301. In addition, the synchronous-detection-lighting controller 404 generates a light amount control timing signal APC of each LD unit using the synchronous detection signal XDETP and the pixel clock PCLK, and transmits the light amount control timing signal APC to the LD controller 301. This signal needs to be performed outside the image writing area, and the light amount is controlled to a target light amount at above-described timing.

The LD controller 301 performs lighting control of the LD unit according to the write data synchronized with the LD forced lighting signal BD, the light amount control timing signal APC, and the pixel clock PCLK. The light beam is emitted from the LD unit, deflected by the polygon mirror 303, and scanned on the photoconductor drum by the f-Θ lens 304 and the return mirror 305.

A polygon motor controller 406 controls the rotation of the polygon motor at a predetermined number of rotations in response to a control signal from the printer controller 401. The writing-start-position controller 405 generates a main scanning control signal XLGATE and a sub-scanning control signal XFGATE for determining an image writing start timing and an image width based on the synchronous detection signal XDETP, the pixel clock PCLK, and the control signal from the printer controller 401.

The sensors sr1 to sr3 are an example of a detection device that detects the image pattern (toner image) such as the image misregistration correction pattern or the image density adjustment pattern and sends the detected image pattern to the printer controller 401. The sensors sr1 to sr3 are disposed at three positions along a direction intersecting the movement direction of the intermediate transfer belt 10. The printer controller 401 calculates a misregistration amount and a light amount correction amount based on the detection result of the image pattern and generates correction data such as the misregistration amount and the light amount correction amount. The printer controller 401 sets the generated correction data in the writing-start-position controller 405, the pixel clock generator 403, the polygon motor controller 406, and the LD controller 301, and stores the generated correction data in the correction data storage device 402.

The sensors sr4 to sr5 are an example of a detection device that detects the image pattern (toner image) such as the image misregistration correction pattern or the image density adjustment pattern on the recording sheet, and sends the detected image pattern to the printer controller 401. In addition, the sensors sr4 and sr5 are disposed at two positions on an end of the recording sheet in a direction intersecting with a conveyance direction of the toner image fixed on the recording sheet as an example of a print medium. The printer controller 401 calculates the misregistration amount and the light amount correction amount based on the detection result of the image pattern, generates the correction data such as the misregistration amount or the light amount correction amount, sets the generated correction data in the writing-start-position controller 405, the pixel clock generator 403, the polygon motor controller 406, and the LD controller 301, and stores the generated correction data in the correction data storage device 402.

When an image forming operation is performed, the correction data stored is read from the correction data storage device 402 in accordance with an instruction from the printer controller 401. The correction data is set in the writing-start-position controller 405, the pixel clock generator 403, the polygon motor controller 406, and the LD controller 301.

The printer controller 401 includes a generator of an image pattern such as an image misregistration correction pattern or an image density adjustment pattern, generates an instructed image pattern, and transmits the image pattern to the LD controller 301. Image data transmitted from a scanner or a personal computer (PC) undergo signal processing in the printer controller 401 and are transmitted to the LD controller 301.

Figure 4B:
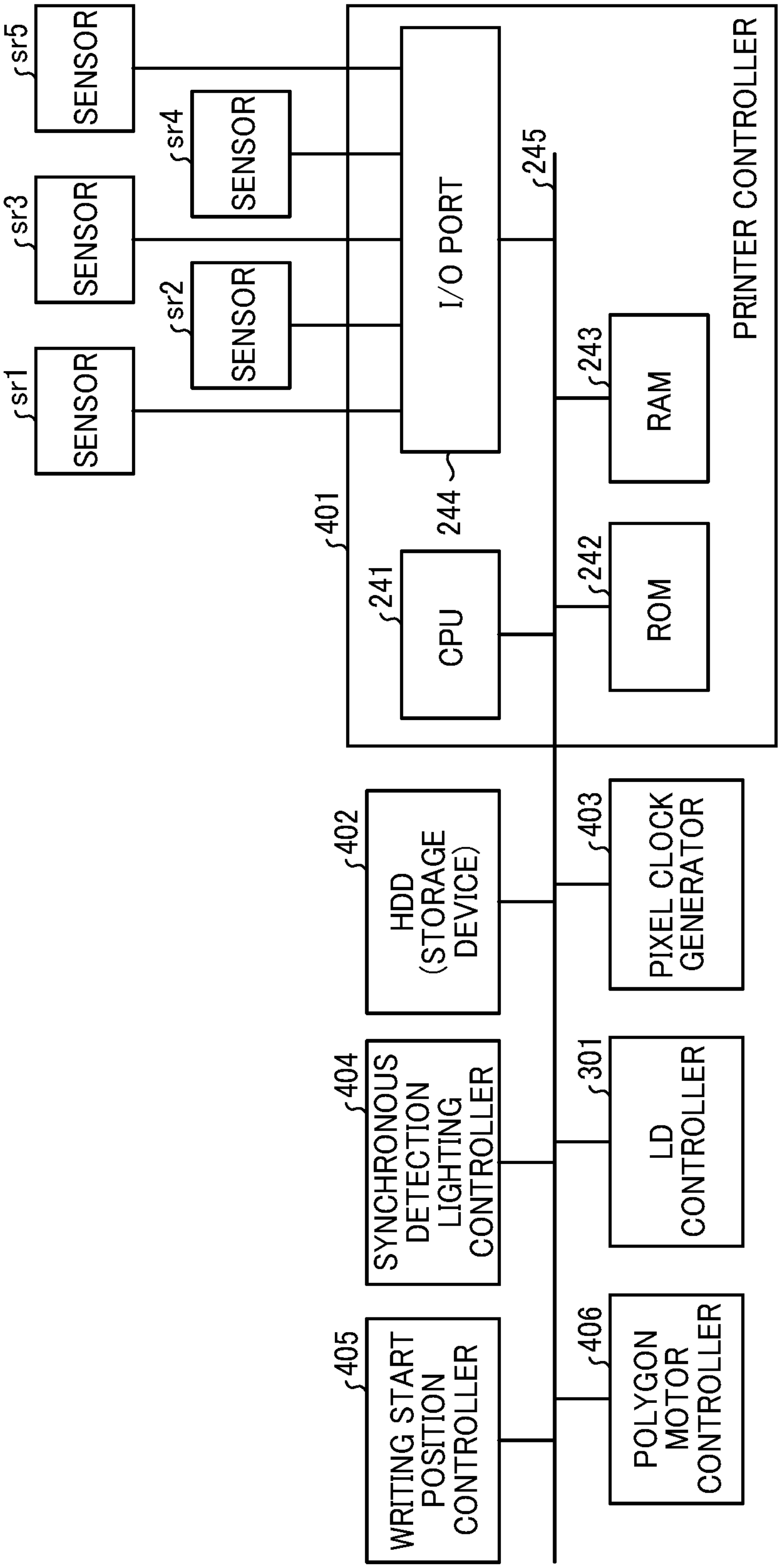
FIG. 4B is a diagram illustrating a hardware configuration of a printer controller disposed in the image forming apparatus, according to the first embodiment of the present disclosure.

FIG. 4B is a diagram illustrating a hardware configuration of the printer controller of the color image forming apparatus, according to the first embodiment of the present disclosure. As illustrated in FIG. 4B, the printer controller 401 includes a central processing unit (CPU) 241, a read only memory (ROM) 242, a random access memory (RAM) 243, and an input/output (I/O) port 244.

The CPU 241 is an arithmetic device that sequentially executes, e.g., branching processing or iterative processing by executing a program stored in the ROM 242. The ROM 242 is a non-volatile storage device in which a program executed in the CPU 241 is stored. The RAM 243 is a memory that functions as a work area (working area) for the operation of the CPU 241.

A bus line 245 is, e.g., an address bus or a data bus to electrically connect the components such as the CPU 241. The I/O port 244 is an interface to which various signals such as signals output from the sensor sr1, the sensor sr2, the sensor sr3, the sensor sr4, and the sensor sr5 are input and from which various signals are output. The hardware configuration of the printer controller 401 is not limited to the above-described hardware configuration and may be any other hardware configuration that can implement the function of the printer controller 401 described above.

The LD controller 301, the pixel clock generator 403, the synchronous-detection-lighting controller 404, the writing start position controller 405, and the polygon motor controller 406 may be configured by an application specific integrated circuit (ASIC). The LD controller 301, the pixel clock generator 403, the synchronous-detection-lighting controller 404, the writing start position controller 405, and the polygon motor controller 406 may be configured by a single ASIC or a plurality of ASICs. The LD controller 301, the pixel clock generator 403, the synchronous-detection-lighting controller 404, the writing start position controller 405, and the polygon motor controller 406 may be implemented by a hardware configuration similar to the hardware configuration implementing the printer controller 401. The correction data storage device 402 may be implemented by a non-volatile storage medium such as a hard disk drive (HDD).

Figure 5:
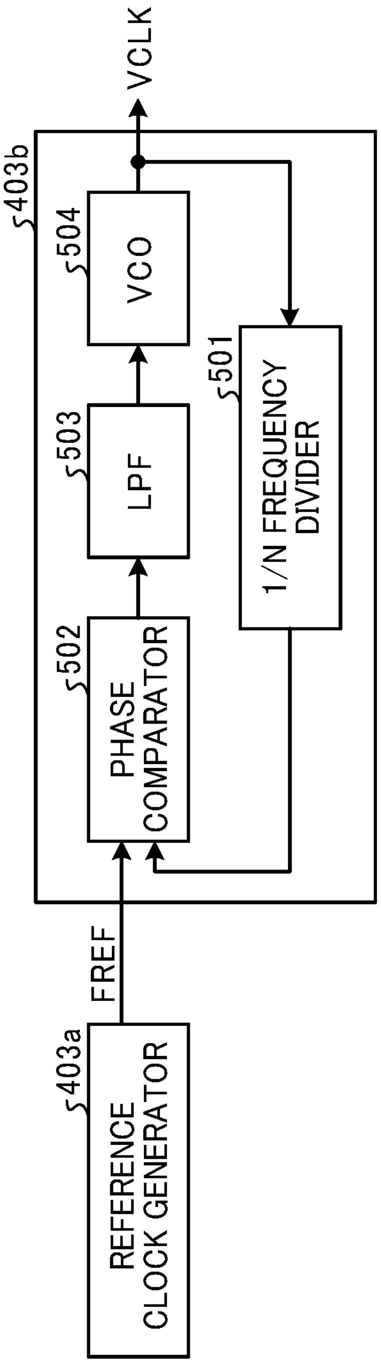
FIG. 5 is a diagram illustrating a functional configuration of a reference clock generator and a voltage-controlled oscillator (VCO) clock generator in a pixel clock generator disposed in the printer of the image forming apparatus according to the first embodiment of the present disclosure.

FIG. 5 is diagram illustrating a functional configuration of a reference clock generator and a voltage-controlled oscillator (VCO) clock generator in a pixel clock generator disposed in the printer, according to the first embodiment of the present disclosure. A reference clock generator 403*a* generates a reference clock signal FREF. A VCO clock generator 403*b* inputs the reference clock signal FREF from the reference clock generator 403*a* and a signal obtained by N-dividing the VCLK by a 1/N frequency divider 501 to a phase comparator 502.

The phase comparator 502 compares the phases of the falling edges of both signals and outputs an error component as a constant current. Then, the VCO clock generator 403*b* removes unnecessary high-frequency components and noise included in the constant current output from the phase comparator 502 by a low pass filter (LPF) 503 and transmits the constant current to a VCO 504. The VCO 504 outputs an oscillation frequency depending on the output of the LPF 503.

Accordingly, the VCO clock generator 403*b* can vary the frequency of the VCLK by varying the frequency of the reference clock signal FREF and the frequency division ratio "N" in the 1/N frequency divider 501 from the printer controller 401. As the frequency of the VCLK changes, the frequency of the pixel clock PCLK also changes. For example, the frequency of the pixel clock PCLK is slowed down to increment the image magnification in the main scanning direction.

Figure 6:
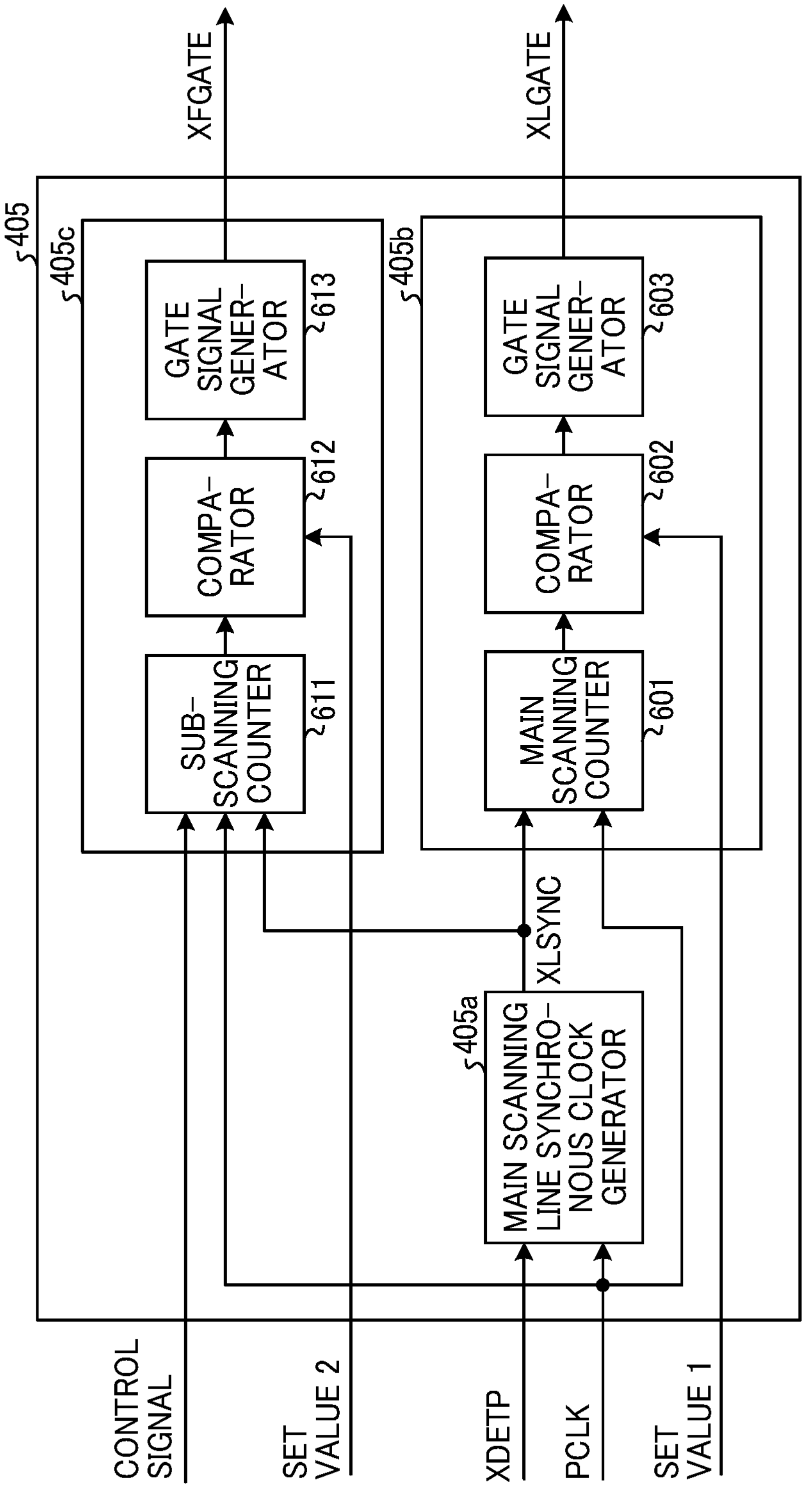
FIG. 6 is a diagram illustrating a functional configuration of a writing-start-position controller disposed in the printer of the image forming apparatus according to the first embodiment of the present disclosure.

FIG. 6 is a diagram illustrating a functional configuration of the writing-start-position controller 405 disposed in the printer, according to the first embodiment of the present disclosure. The writing-start-position controller 405 includes a main-scanning-line synchronous signal generator 405*a*, a main scanning gate signal generator 405*b*, and a sub-scanning gate signal generator 405*c*.

The main-scanning-line synchronous signal generator 405*a* generates an XLSYNC signal for operating a main scanning counter 601 in the main scanning gate signal generator 405*b* and a sub-scanning counter 611 in the sub-scanning gate signal generator 405*c*. The main scanning gate signal generator 405*b* generates an XLGATE signal for determining the timing of capturing an image signal (timing of writing out an image in the main scanning direction). The sub-scanning gate signal generator 405*c* generates an XFGATE signal for determining the timing of capturing an image signal (timing of writing out an image in the sub-scanning direction).

The main scanning gate signal generator 405*b* includes the main scanning counter 601, a comparator 602, and a gate signal generator 603. The main scanning counter 601 operates with XLSYNC and PCLK. The comparator 602 compares the counter value of the main scanning counter 601 with a set value 1 (correction data) from the printer controller 401 and outputs the result. A gate signal generator 603 generates the XLGATE from the comparison result from the comparator 602.

The sub-scanning gate signal generator 405*c* includes a sub-scanning counter 611, a comparator 612, and a gate signal generator 613. The sub-scanning counter 611 operates based on the control signal (a print start signal) from the printer controller 401, the XLSYNC, and the PCLK. The comparator 612 compares the counter value of the sub-scanning counter 611 with a set value 2 (correction data) from the printer controller 401 and outputs the result. The gate signal generator 613 generates the XFGATE from the comparison result from the comparator 612.

The writing-start-position controller 405 corrects the writing position in the main scanning direction in units of one cycle of the PCLK, that is, in units of one dot of the pixel clock PCLK, and corrects the writing position in the sub-scanning direction in units of one cycle of the XLSYNC, that is, in units of one line of the XLSYNC. The correction data is stored in the correction data storage device 402 with respect to the main-scanning direction and sub-scanning direction.

Figure 7:
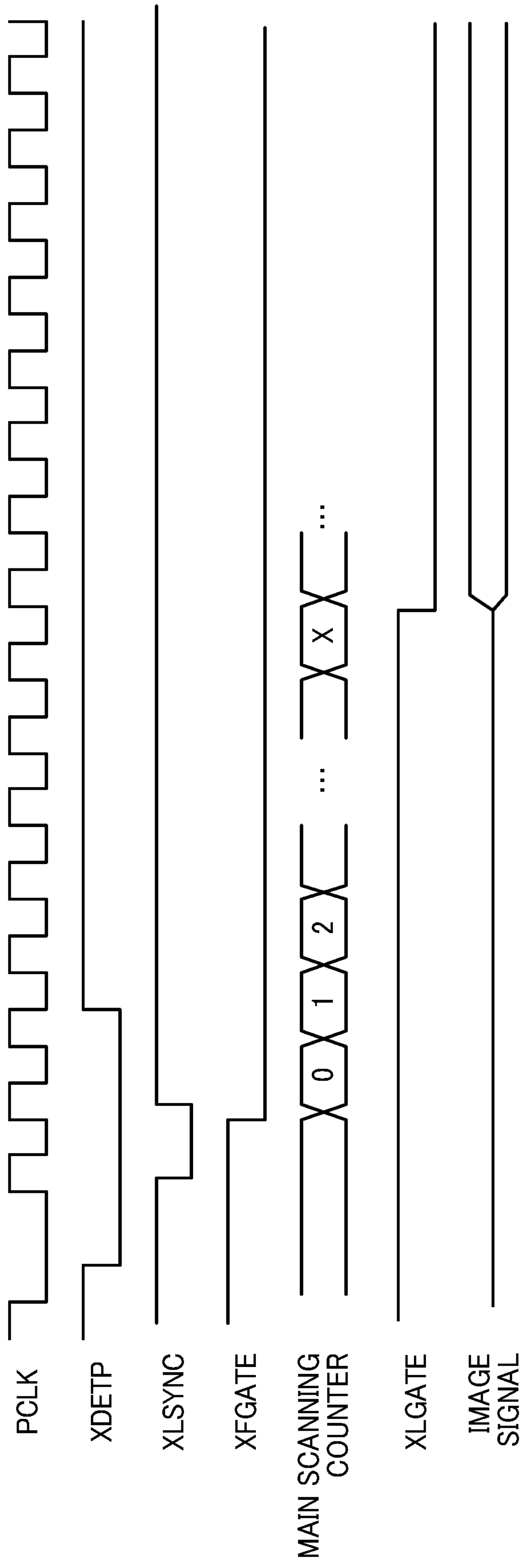
FIG. 7 is a timing chart illustrating an example of control processing of a writing start position in a main scanning direction by the writing-start-position controller disposed in the printer of the image forming apparatus according to the first embodiment of the present disclosure.

FIG. 7 is a timing chart of control processing of a writing-start-position in a main scanning direction by the writing-start-position controller disposed in the printer, according to the first embodiment of the present disclosure. In the writing-start-position controller 405, the main scanning counter 601 is reset by XLSYNC, and the counter value is counted up by PCLK. When the counter value reaches the set value 1 (for example, X) set by the printer controller 401, the comparison result is output from the comparator 602, and XLGATE is set to Low level (valid) by the gate signal generator 603. The XLGATE is a signal lowered in level for an image width in the main scanning direction.

Figure 8:
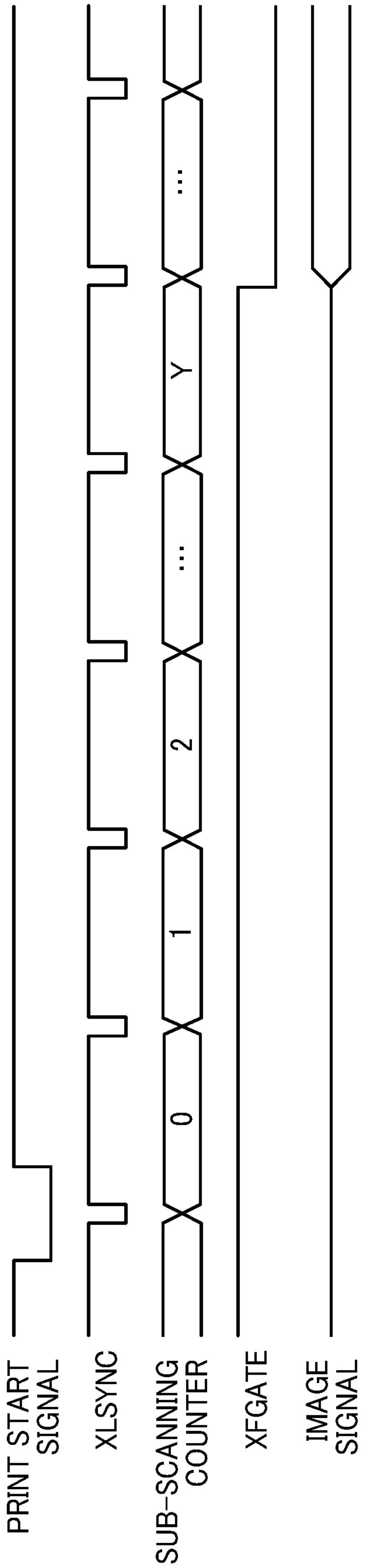
FIG. 8 is a timing chart illustrating an example of control processing of a writing start position in a sub-scanning direction by the writing-start-position controller disposed in the printer of the image forming apparatus according to the first embodiment of the present disclosure.

FIG. 8 is a timing chart of control processing of a writing start position in a sub-scanning direction by the writing-start-position controller disposed in the printer, according to the first embodiment of the present disclosure. In the writing-start-position controller 405, the sub-scanning counter 611 is reset by a print start signal from the printer controller 401, and the counter value is counted up by XLSYNC. When the counter value reaches the set value 2 (for example, Y) set by the printer controller 401, the comparison result is output from the comparator 612, and XFGATE is set to Low level (valid) by the gate signal generator 603. The XFGATE is a signal lowered in level for an image length in the sub-scanning direction.

Figure 9:
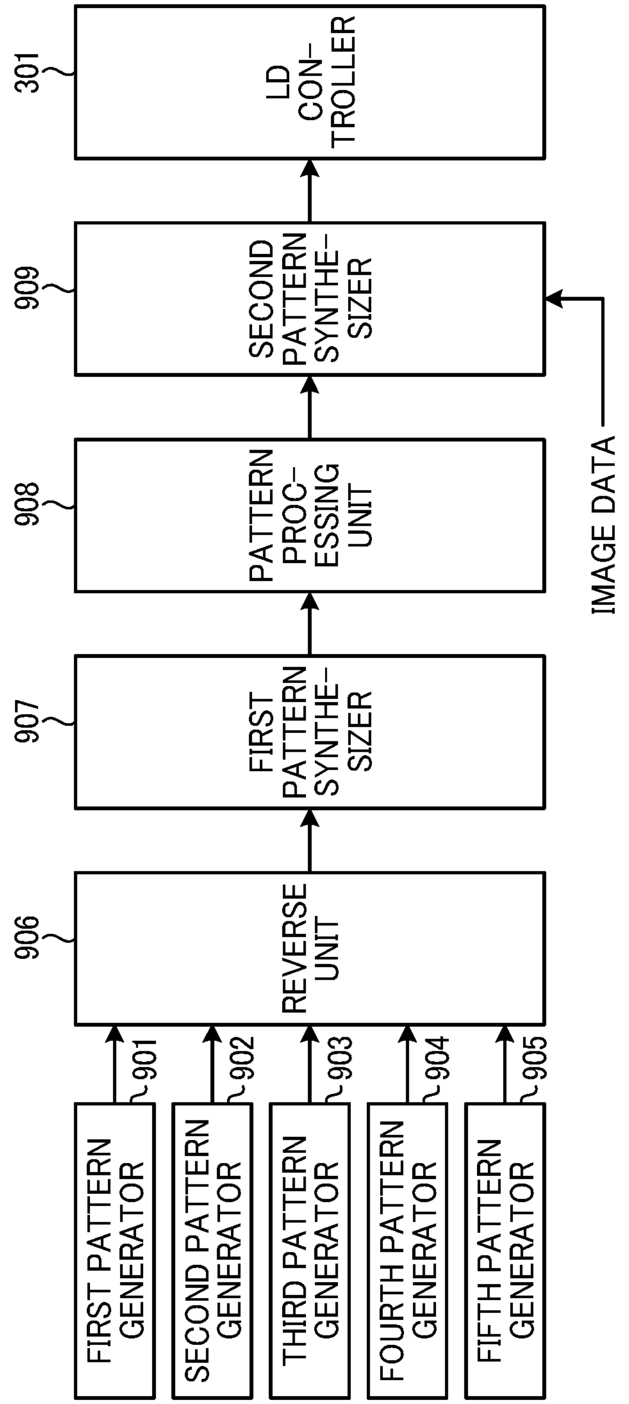
FIG. 9 is a diagram illustrating a functional configuration of a printer controller disposed in the printer of the image forming apparatus according to the first embodiment of the present disclosure.

FIG. 9 is a diagram illustrating a functional configuration of a printer controller disposed in the printer, according to the first embodiment of the present disclosure. The printer controller 401 generates image patterns that include, for example, an image misregistration correction pattern, an image density adjustment pattern, or a test chart for checking the state of the image forming apparatus. In the present embodiment, the printer controller 401 includes a first pattern generator 901 to a fifth pattern generator 905 that generate image patterns different from each other. That is, the printer controller 401 can generate five types of image patterns. The image patterns generated by each of the pattern generators from the first pattern generator 901 to the fifth pattern generator 905 are output to a reverse unit 906.

The reverse unit 906 can select whether to reverse the image pattern. The reverse unit 906 reverses the black and white of the input image pattern and outputs the reversed image pattern to a first pattern synthesizer 907 in a case where the black and white of the image pattern is reversed. On the other hand, the reverse unit 906 outputs the image pattern as it is to the first pattern synthesizer 907 in a case where the black and white of the image pattern is not reversed. That is, the reverse unit 906 reverses black and white of at least one of the image patterns when two or more types of image patterns are combined. As a result, the number of types of image patterns can be easily increased.

The first pattern synthesizer 907 synthesizes the image patterns and outputs the synthesized image pattern to a pattern processing unit 908. That is, the first pattern generator 901 to the fifth pattern generator 905, the reverse unit 906, and the first pattern synthesizer 907 function as an example of a patch-image-data generator 900 that generates an image pattern in which two or more types of image patterns (an example of a patch image) are combined. In the present embodiment, a combination of patch images of different colors may be used.

The pattern processing unit 908 is an example of a patch-image-data changing unit that changes image data around at least one image pattern to be less than the maximum value when two or more types of patch images are combined. As a result, when a pattern image other than a predetermined pattern image is generated, the number of types of pattern images that can be generated can be increased without adding any new pattern generation function. When a plurality of preset image patterns are simultaneously generated in order to increase the number of types of image patterns, an incident in which the image patterns cannot be recognized due to superimposing of the image patterns can be prevented.

That is, when two or more image patterns are synthesized, the pattern processing unit 908 changes the image data of the boundary if the boundary is unclear and the image pattern cannot be recognized. For example, when the image data of the boundary is the same two hundred fifty fifth gradation, the pattern processing unit 908 changes the image data of the boundary to the zeroth to two hundred fifty fourth gradations. More preferably, the pattern processing unit 908 changes the image data of the boundary to the one hundred twenty eighth gradation corresponding to ½ or zero.

A second pattern synthesizer 909 synthesizes the image data to be printed and the patterns generated by the first pattern generator 901 to the fifth pattern generator 905. For example, the second pattern synthesizer 909 adds patterns to four corners of image data to be printed, detects an image misregistration, and outputs an image while correcting the image misregistration. The second pattern synthesizer 909 sends the synthesized pattern to the LD controller 301 and controls lighting of the LD unit according to the write data.

Figure 10:
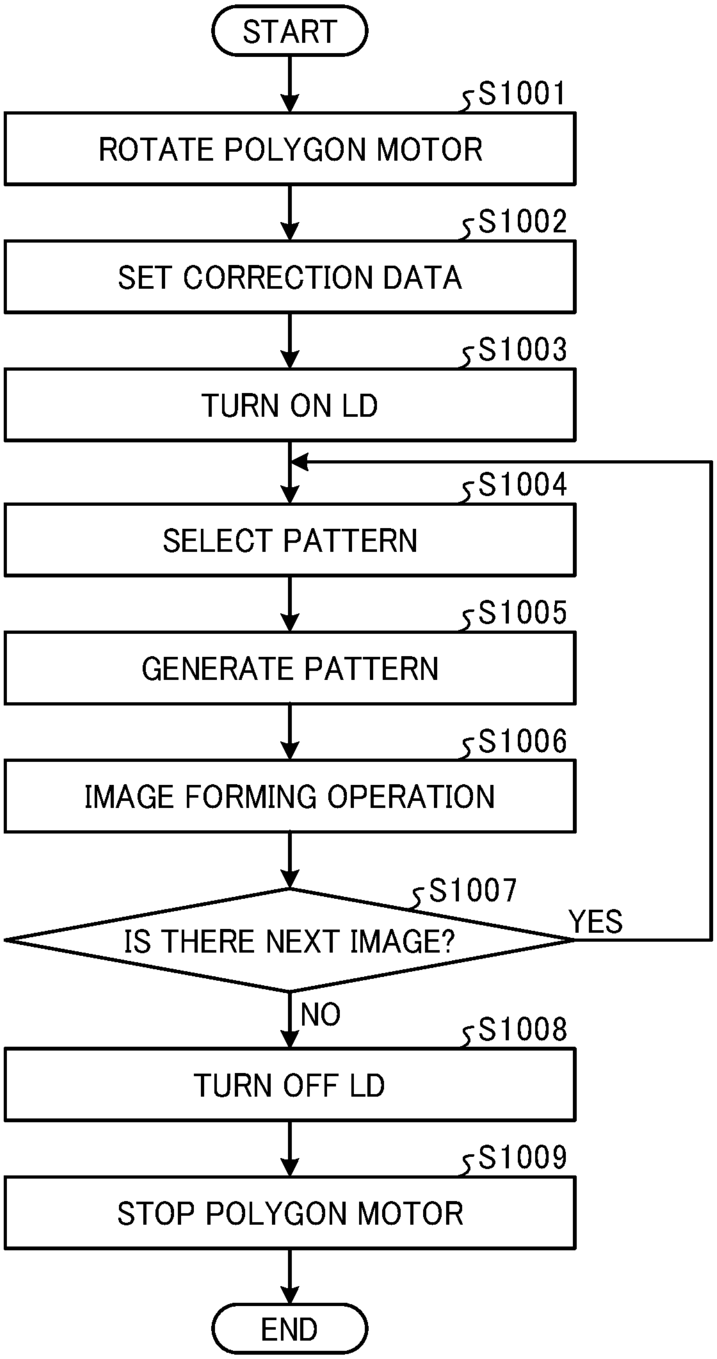
FIG. 10 is a flowchart of an example of control processing of a laser diode (LD) unit performed by the image forming apparatus according to the first embodiment of the present disclosure.

FIG. 10 is a flowchart of control processing of an LD unit performed by the image forming apparatus, according to the first embodiment of the present disclosure. First, the printer controller 401 causes the polygon motor controller 406 to rotate the polygon motor at a predetermined number of rotations per unit time (in step S1001 of FIG. 10).

The printer controller 401 sets the correction data (for example, the writing start position in the main scanning direction, the writing start position in the sub-scanning direction, and the set value of the magnification) stored in the correction data storage device 402 to each controller (for example, the writing-start-position controller 405, the pixel clock generator 403, the polygon motor controller 406, and the LD controller 301) (in step S1002 of FIG. 10). The printer controller 401 illuminates the LD unit (in step S1003 of FIG. 10) to output the synchronous detection signal and performs an APC operation to prepare for turning on each LD unit with a specified amount of light.

Thereafter, the patch-image-data generator 900 of the printer controller 401 selects an image pattern to be generated (in step S1004 of FIG. 10), synthesizes the selected image patterns (in step S1005 of FIG. 10), and forms the image pattern (in step S1006 of FIG. 10).

The patch-image-data generator 900 of the printer controller 401 determines whether there is any next image pattern to be formed (in step S1007 of FIG. 10). If there is a next image pattern to be formed (YES in step S1007 of FIG. 10), the printer controller 401 repeats the processing of steps S1004 to S1006 in FIG. 10. On the other hand, if there is no image pattern to be formed next (NO in step S1007 of FIG. 10), the printer controller 401 turns off each LD unit (in step S1008 of FIG. 10), stops the polygon motor, and ends the process (in step S1009 of FIG. 10).

Figure 11:
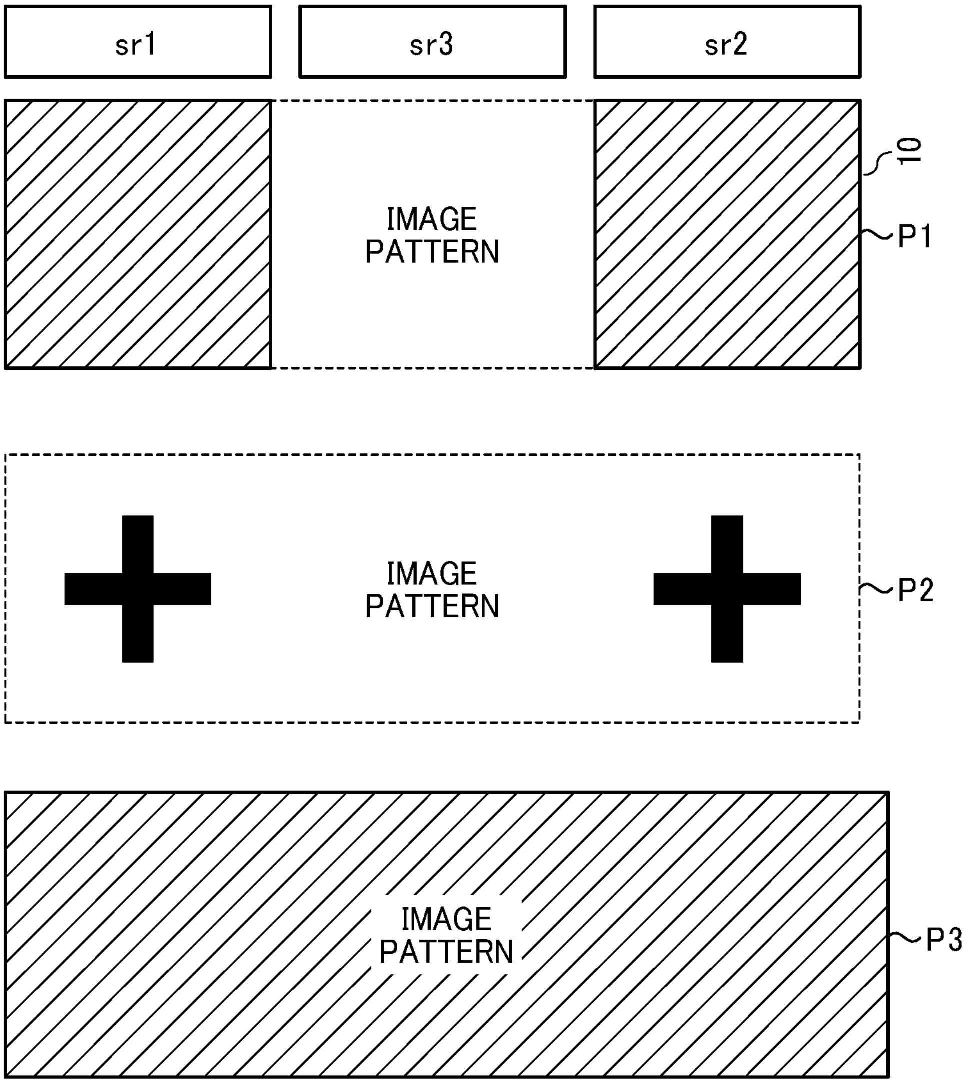
FIG. 11 is a diagram illustrating an image pattern to be formed on an intermediate transfer belt, and a sensor, in the image forming apparatus according to the first embodiment of the present disclosure.

FIG. 11 is a diagram illustrating the image pattern to be formed on the intermediate transfer belt, and a sensor, in the image forming apparatus, according to the first embodiment of the present disclosure. An image pattern P1 generated by the first pattern generator 901 is an image pattern for detecting the image density using the sensors sr1 and sr2. The sensors sr1 and sr2 are an example of a detection device that can detect an image pattern in the vicinity of both end portions of the intermediate transfer belt 10 in the main scanning direction.

An image pattern P2 generated by a second pattern generator 902 is an image pattern for detecting the image misregistration using the sensors sr1 and sr2. An image pattern P3 generated by a third pattern generator 903 is an image pattern for detecting the image density using the sensors sr1 to sr3. A sensor sr3 is an example of a detection device that can detect an image pattern in the vicinity of the central portion of the intermediate transfer belt 10 in the main scanning direction.

Figure 12:
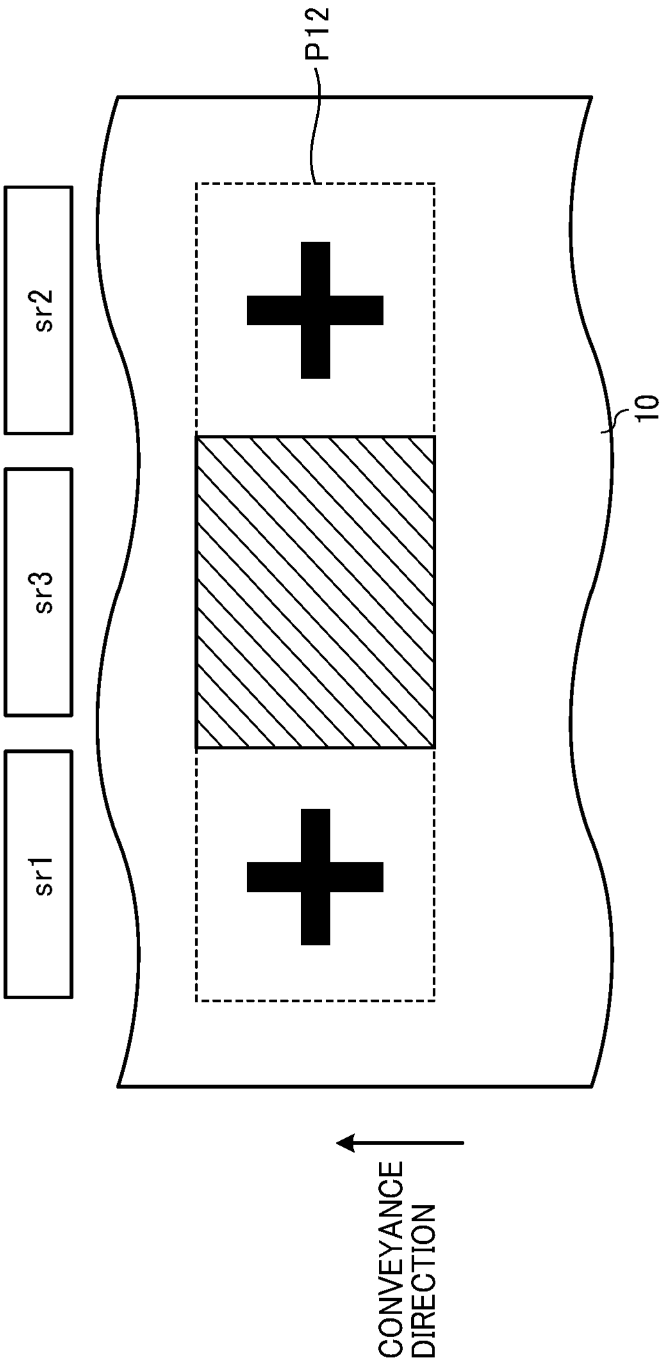
FIG. 12 is a diagram illustrating sensors and a synthesized pattern formed on an intermediate transfer belt by the image forming apparatus according to the first embodiment of the present disclosure.

FIG. 12 is a diagram illustrating an example of a sensor and a synthesized image pattern formed on the intermediate transfer belt by the image forming apparatus according to the first embodiment. For example, the image pattern P1 is generated by the first pattern generator 901, is reversed (for example, black and white reversing) by the reverse unit 906, and is transmitted to the first pattern synthesizer 907. At the same time, the image pattern P2 is generated by the second pattern generator 902, and is sent to the first pattern synthesizer 907 without being reversed by the reverse unit 906. The first pattern synthesizer 907 can generate an image pattern P12 illustrated in FIG. 12 by synthesizing the two image patterns P1 and P2. By using the image pattern P12, the image position can be detected by the sensors sr1 and sr2, and the image density can be detected by the sensor sr3.

Figure 13:
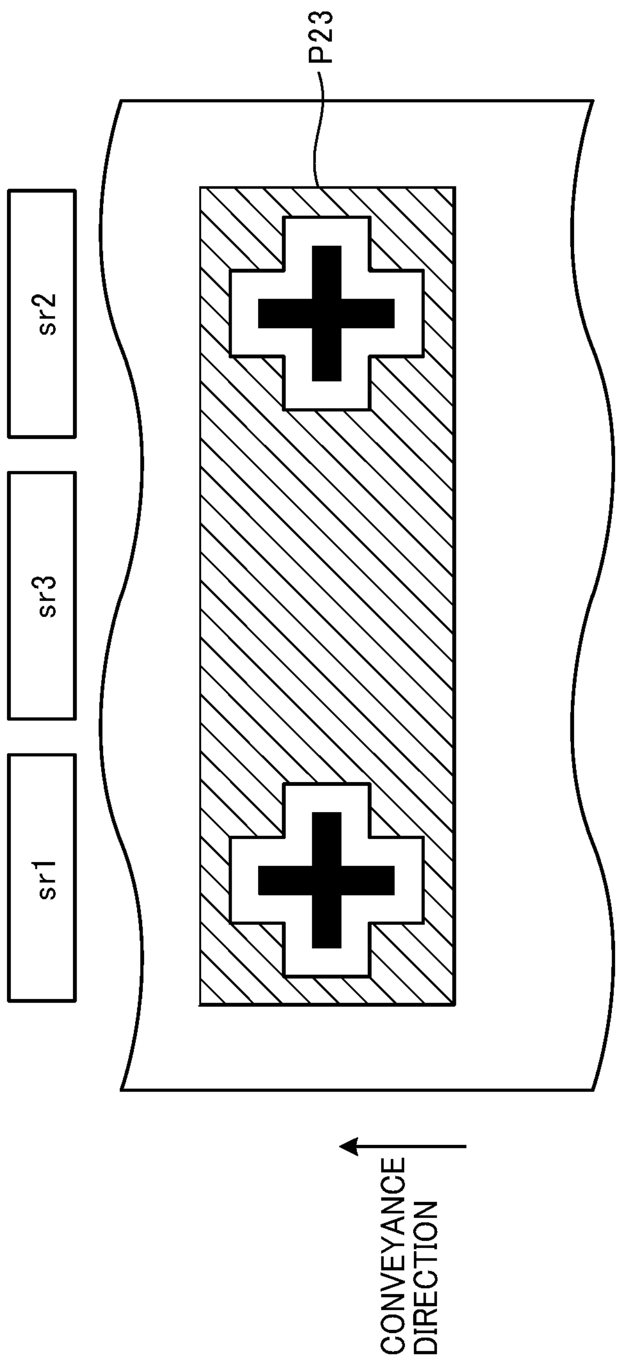
FIG. 13 is a diagram illustrating sensors and a synthesized image pattern formed on the intermediate transfer belt by the image forming apparatus according to the first embodiment of the present disclosure.

FIG. 13 is a diagram illustrating a synthesized image pattern formed on the intermediate transfer belt by the image forming apparatus, and a sensor, according to the first embodiment of the present disclosure. For example, the second pattern generator 902 generates the image pattern P2 and transmits the image pattern P2 to the first pattern synthesizer 907. At the same time, the third pattern generator 903 generates the image pattern P3 and sends the image pattern P3 to the first pattern synthesizer 907. After the image pattern P2 and the image pattern P3 are synthesized by the first pattern synthesizer 907 to generate an image pattern P23, the pattern processing unit 908 deletes the peripheral dots of the image pattern P2 in the image pattern P23, that is, sets the peripheral dots of the image pattern P2 to zero. As a result, the image position can be detected by the sensors sr1 and sr2, and at the same time, the image density can also be detected by the sensor sr3.

Figure 14:
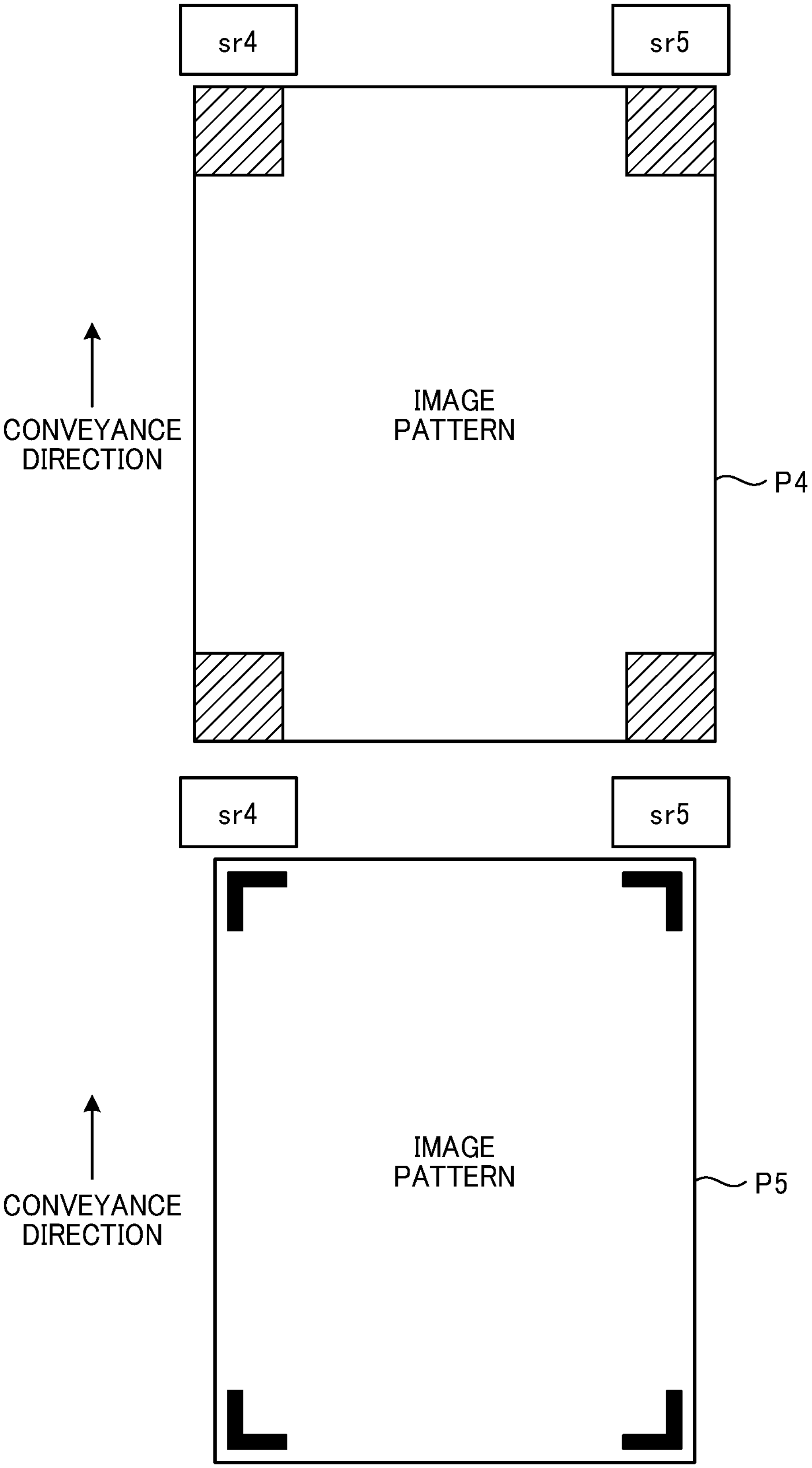
FIG. 14 is a diagram illustrating an example of the positions of sensors and an image pattern to be formed on a recording sheet by the image forming apparatus according to the first embodiment of the present disclosure.

FIG. 14 is a diagram illustrating an image pattern to be formed on a recording sheet by the image forming apparatus, and a position of a sensor, according to the first embodiment of the present disclosure. An image pattern P4 generated by the fourth pattern generator 904 is an image pattern for detecting the image density using the sensors sr4 and sr5. The sensors sr4 and sr5 are an example of a detection device that can detect image patterns in the vicinity of both ends of the recording sheet in the main scanning direction. In the present embodiment, the sensors sr4 and sr5 are disposed downstream from the fixing device in the conveyance direction of the recording sheet. An image pattern P5 generated by the fifth pattern generator 905 is an image pattern for detecting the image misregistration on the recording sheet using the sensors sr4 and sr5.

Figure 15:
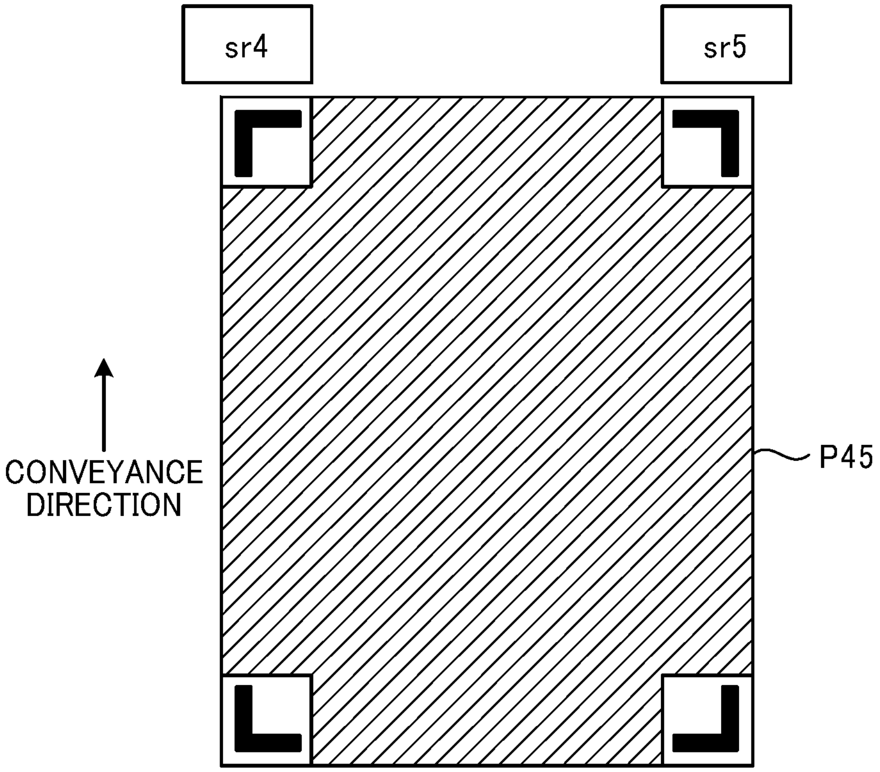
FIG. 15 is a diagram illustrating an example of the positions of sensors and a synthesized image pattern formed on the recording sheet by the printer of the image forming apparatus according to the first embodiment of the present disclosure.

FIG. 15 is a diagram illustrating a synthesized image pattern formed on the recording sheet by the printer, and a position of a sensor, according to the first embodiment of the present disclosure. For example, when the image pattern P4 is generated by the fourth pattern generator 904, the reverse unit 906 reverses the image pattern P4 and sends the reversed image pattern P4 to the first pattern synthesizer 907. At the same time, when the image pattern P5 is generated by the fifth pattern generator 905, the reverse unit 906 sends the image pattern P5 to the first pattern synthesizer 907 without reversing the image pattern P5.

Next, the first pattern synthesizer 907 synthesizes the two image patterns P4 and P5 to generate an image pattern P45 illustrated in FIG. 15. By using the image pattern P45, unlike the image pattern P5, the image position can be detected in a state in which the image pattern P45 is printed on the recording sheet. By comparing with the image misregistration of the image pattern P5, the influence of the presence or absence of the image pattern on the image misregistration can be found.

The image forming apparatus according to the present embodiment generates, for example, the image pattern P4 in magenta and the image pattern P5 in black. When the above-described process is executed, the image forming apparatus can detect the image position of the color image in a state in which the magenta image pattern P4 is printed on the recording sheet. When the same image pattern is generated in two colors in the image pattern P4, the image position can be detected in a state in which the image pattern in which two colors are superimposed is printed on the recording sheet. That is, the image pattern may be a combination of image patterns of different colors. As a result, the number of types of image patterns can be increased.

As described above, according to the image forming apparatus of the first embodiment, when a pattern image other than a predetermined pattern image is generated, the number of types of pattern images that can be generated can be increased without adding a new pattern generation function. When a plurality of preset image patterns are simultaneously generated in order to increase the number of types of image patterns, an incident in which the image patterns cannot be recognized due to superimposing of the image patterns can be prevented.

Second Embodiment

A second embodiment is an example in which an image pattern transferred to a secondary transfer belt is detected. In the following description, the description of the same components as those of the first embodiment is omitted.

Figure 16:
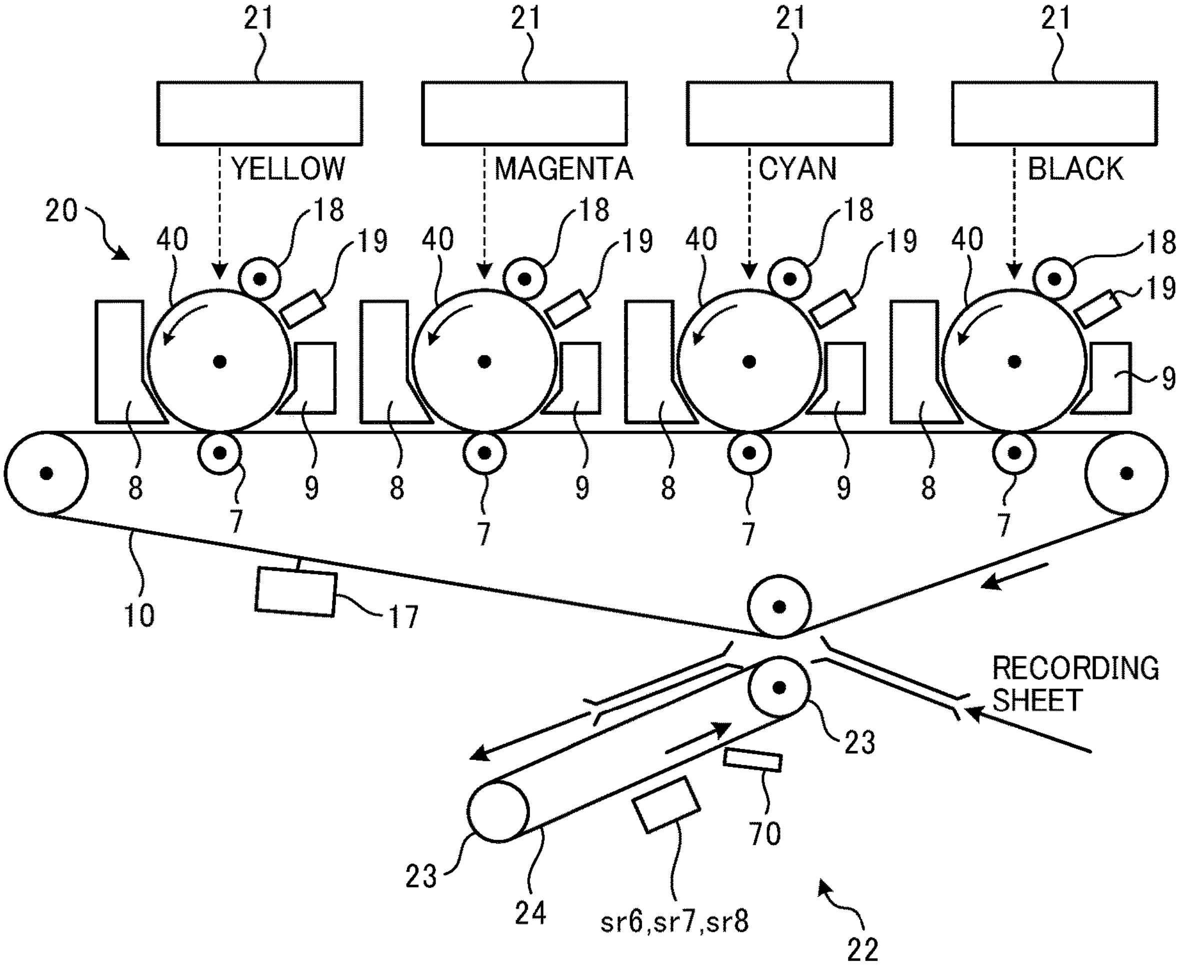
FIG. 16 is a diagram illustrating a configuration of an image forming device disposed in an image forming apparatus according to a second embodiment of the present disclosure.

FIG. 16 is a diagram illustrating a configuration of an image forming device disposed in an image forming apparatus according to the second embodiment of the present disclosure. In the second embodiment, the image forming device 20 includes, in addition to the intermediate transfer belt 10 (an example of a first transfer belt), a secondary transfer belt 24 (an example of a second transfer belt) to contact the intermediate transfer belt 10.

The secondary transfer unit 22 of the image forming device 20 transfers an image pattern (correction pattern) formed on the intermediate transfer belt 10 onto the secondary transfer belt 24. Sensors sr6 to sr8 are reflection-type optical sensors and detect an image pattern formed on the secondary transfer belt 24. The sensors sr6 to sr8 supply the detected image pattern to the printer controller 401. The printer controller 401 calculates an image misregistration of an image pattern (an image pattern formed on the secondary transfer belt 24 in the second embodiment) and generates correction data for correcting the image misregistration in the same manner as in the above-described first embodiment.

This correction data is set in the writing-start-position controller 405 and the pixel clock generator 403, and is stored in the correction data storage device 402. When an image forming operation is performed, the correction data stored in the correction data storage device 402 is read by the printer controller 401, which is an example of a correction unit, and is set in the writing-start-position controller 405 and the pixel clock generator 403. The image pattern having passed through the sensors sr6 to sr8 is removed by a secondary transfer belt cleaner 70. The description of the image pattern transferred to the secondary transfer belt 24 is omitted, because the secondary transfer belt 24 is interchangeable with the intermediate transfer belt 10 in FIGS. 11 to 13. The sensors sr6 to sr8 may have the same configurations as the sensors sr1 to sr3 illustrated in FIGS. 11 to 13.

As described above, according to the printer 100 of the second embodiment, even when the image pattern transferred to the secondary transfer belt 24 is detected, the same functional effect as those of the first embodiment can be obtained.

Third Embodiment

In an inkjet printer of a third embodiment of the present disclosure, an image pattern is generated by combining two or more types of patch images. When the two or more types of patch images are combined, image data around at least one of patch images is changed to less than the maximum value. In the following description, a description of the same configuration as the description of above-described embodiment is omitted.

Figure 17:
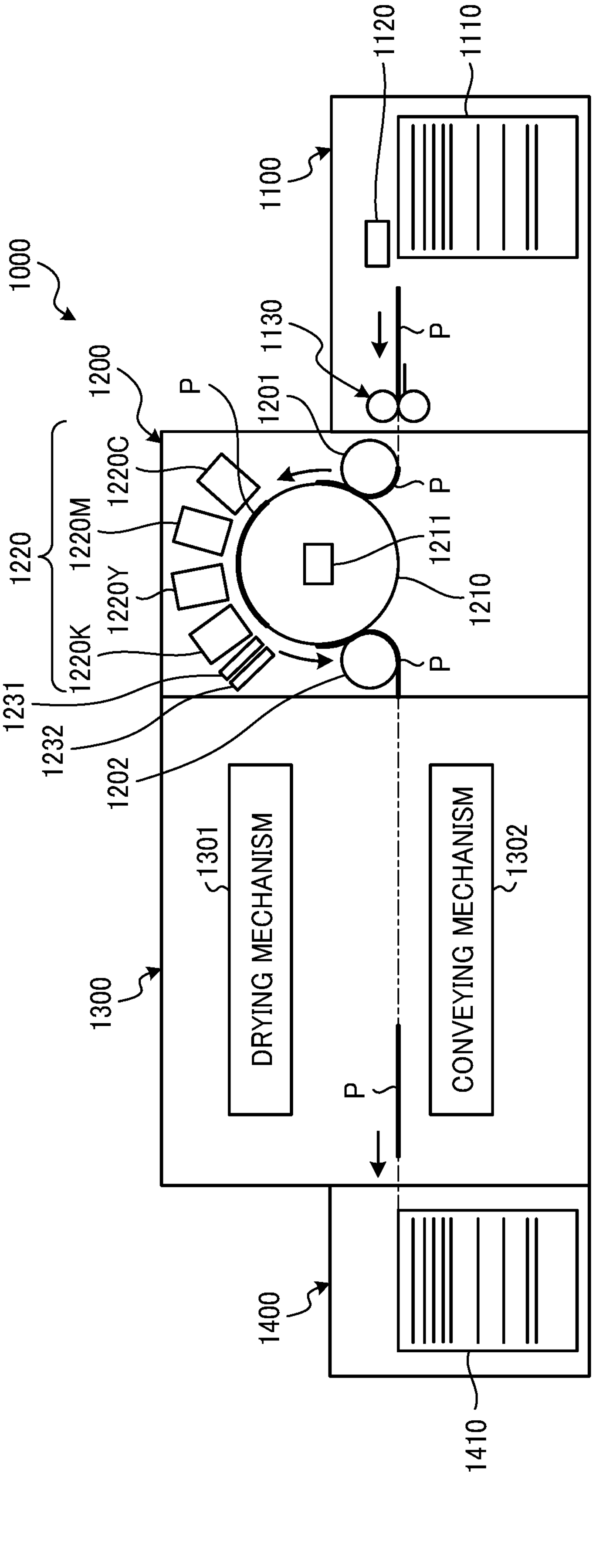
FIG. 17 is a diagram illustrating a schematic configuration of an inkjet recording apparatus according to a third embodiment of the present disclosure.

FIG. 17 is a diagram illustrating a schematic configuration of an inkjet recording apparatus according to the third embodiment of the present disclosure. As illustrated in FIG. 17, an inkjet recording apparatus 1000 includes a sheet feeder 1100, an image forming device 1200, a drying device 1300, and a sheet ejection device 1400. In the inkjet recording apparatus 1000, the image forming device 1200 forms an image on a sheet P with ink, which is an example of liquid for image formation, on the sheet P as an example of a recording medium as a sheet material fed from the sheet feeder 1100. The inkjet recording apparatus 1000 ejects the sheet P through the sheet ejection device 1400 after the drying device 1300 dries the ink applied onto the sheet P.

First, a description is given of the sheet feeder 1100.

The sheet feeder 1100 mainly includes a sheet feeding tray 1110 on which a plurality of sheets P are stacked, a feeding device 1120 that separates and feeds the sheets P one by one from the sheet feeding tray 1110, and a registration roller pair 1130 that feeds the sheets P to the image forming device 1200.

The feeding device 1120 may be a feeding device that includes rollers, a feeding device employing an air suction method, and any other feeding devices.

The sheet feeder 1100 drives the registration roller pair 1130 at a specified timing after the leading end of the sheet P fed from the sheet feeding tray 1110 by the feeding device 1120 has reached the registration roller pair 1130. Thus, the sheet P is fed to the image forming device 1200.

In the present embodiment, the configuration of the sheet feeder 1100 is not limited to any particular configuration and may be any configuration as long as the sheet feeder 1100 can feed the sheet P to the image forming device 1200.

Next, a description is given of the image forming device 1200.

The image forming device 1200 mainly includes a receiving cylinder 1201, a sheet carrying drum 1210, an ink discharge device 1220, and a delivery cylinder 1202. The receiving cylinder 1201 receives the sheet P fed from the registration roller pair 1130. The sheet carrying drum 1210, which functions as a conveying unit, conveys the sheet P conveyed by the receiving cylinder 1201 while carrying the sheet P on an outer circumferential surface of the sheet carrying drum 1210. The ink discharge device 1220 discharges ink toward the sheet P carried on the sheet carrying drum 1210. The delivery cylinder 1202 delivers the sheet P conveyed by the sheet carrying drum 1210 to the drying device 1300.

The leading end of the sheet P conveyed from the sheet feeder 1100 to the image forming device 1200 is gripped by a sheet gripper disposed on the surface of the receiving cylinder 1201. The sheet P is conveyed along with the movement of the surface of the receiving cylinder 1201. The sheet P conveyed by the receiving cylinder 1201 is delivered to the sheet carrying drum 1210 at a position facing the sheet carrying drum 1210.

A sheet gripper is also disposed on the surface of the sheet carrying drum 1210, and the leading end of the sheet P is gripped by the sheet gripper. Multiple suction holes are dispersedly formed on the surface of the sheet carrying drum 1210. A suction device 1211 generates a suction air flow toward the inside of the sheet carrying drum 1210 in each suction hole.

The leading end of the sheet P delivered from the receiving cylinder 1201 to the sheet carrying drum 1210 is gripped by the sheet gripper. The sheet P is sucked onto the surface of the sheet carrying drum 1210 by the suction air flow and is conveyed along with the movement of the surface of the sheet carrying drum 1210.

The ink discharge device 1220 in the present embodiment is a line-head device that discharges ink of four colors of C (cyan), M (magenta), Y (yellow), and K (black) to form an image and includes individual liquid discharge heads 1220C, 1220M, 1220Y, and 1220K for ink of the four colors.

The configuration of the liquid discharge heads 1220C, 1220M, 1220Y, and 1220K is not limited to any particular configuration and may be any configuration that can discharge. In some embodiments, the liquid discharge device may include a liquid discharge head that discharges special ink such as white, gold, and silver or a liquid discharge head that discharges a surface coating liquid that does not form an image.

Discharge operations of the liquid discharge heads 1220C, 1220M, 1220Y, and 1220K of the ink discharge device 1220 are controlled by drive signals corresponding to image information. When the sheet P carried on the sheet carrying drum 1210 passes through a region facing the ink discharge unit 1220, color inks are discharged from the liquid discharge heads 1220C, 1220M, 1220Y, and 1220K to form an image corresponding to the image information.

In the present embodiment, the configuration of the image forming device 1200 is not limited to any particular configuration as long as an image is formed by applying liquid onto the sheet P.

In addition, as illustrated in FIG. 17, the image forming device 1200 is provided with two scanners 1231 and 1232, which are line scanners, downstream from the ink discharge device 1220 in the conveyance direction of the sheet P. The two scanners 1231 and 1232 are image readers that read the image patterns. The resolutions of the two scanners 1231 and 1232 are lower than the print resolution in the image forming device 1200.

The image forming device 1200 prints an image pattern by the ink discharge device 1220 in a state where the sheet P is attracted by suction on the surface of the sheet carrying drum 1210 and conveyed with the leading end of the sheet P being gripped by the sheet gripper. Immediately after the printing, the two scanners 1231 and 1232 read the image pattern.

Figure 18:
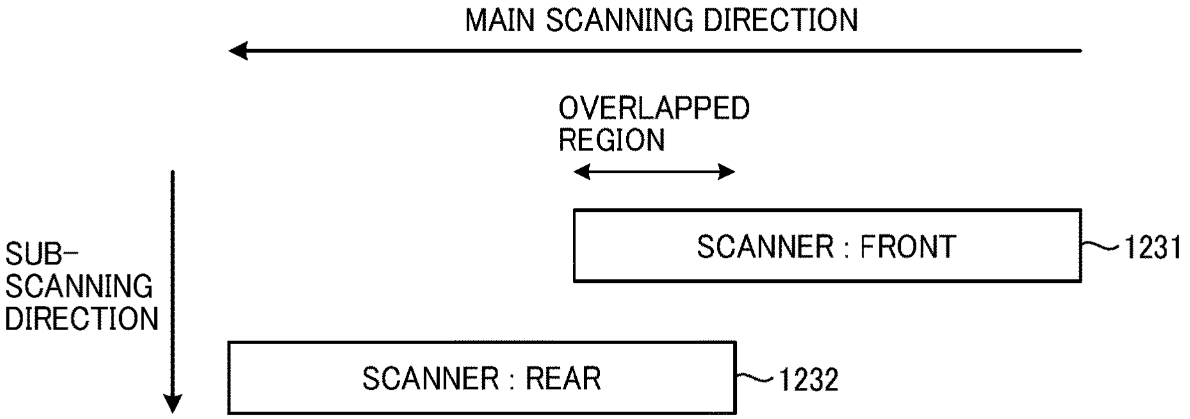
FIG. 18 is a diagram illustrating an arrangement of two scanners disposed in the inkjet recording apparatus according to the third embodiment of the present disclosure.

FIG. 18 is a diagram illustrating an arrangement of two scanners disposed in the inkjet recording apparatus according to the third embodiment of the present disclosure. As illustrated in FIG. 18, the two scanners, i.e., the scanner (front) 1231 and the scanner (rear) 1232, are arranged in a staggered manner to read the entire surface of the sheet P. More specifically, the two scanners 1231 and 1232 have a region (overlapped region) in which the reading ranges overlap each other in the main scanning direction. The two scanners 1231 and 1232 are arranged offset from each other in the sub-scanning direction. In the present embodiment, the scanners 1231 and 1232 functions as an example of a detection device.

Although the two scanners 1231 and 1232 are disposed in the present embodiment, the configuration is not limited thereto. A single scanner or a combination of three or more scanners may be used as long as the reading range in the main scanning direction can be secured.

Next, a description is given of the drying device 1300.

As illustrated in FIG. 17, the drying device 1300 includes a drying mechanism 1301 and a conveying mechanism 1302. The drying mechanism 421 dries ink adhered to the sheet P in the image forming device 1200. A conveying mechanism 422 conveys a sheet P conveyed from the image forming device 1200.

The sheet P conveyed from the image forming device 1200 is received by the conveying mechanism 1302, conveyed to pass through the drying mechanism 1301, and delivered to the sheet ejection device 1400. When the sheet P passes through the drying mechanism 1301, the drying device 1300 dries ink on the sheet P. As a result, liquid components such as moisture in the ink are evaporated, the ink is fixed on the sheet P, and curling of the sheet P is prevented.

Next, a description is given of the sheet ejection device 1400.

The sheet ejection device 1400 includes a sheet ejection tray 1410 on which a plurality of sheets P are stacked. The sheets P conveyed from the drying device 1300 are sequentially stacked and held on the sheet ejection tray 1410.

In the present embodiment, the configuration of the sheet ejection device 1400 is not limited to any particular configuration and may be any configuration that can receive ejected sheets P.

Next, a description is given of other functional devices.

The inkjet recording apparatus 1000 according to the present embodiment includes the sheet feeder 1100, the image forming device 1200, the drying device 1300, and the sheet ejection device 1400. However, other functional devices may be added as appropriate. For example, a pre-processing device that performs pre-processing of image formation may be added between the sheet feeder 1100 and the image forming device 1200. Alternatively, a post-processing device that performs post-processing of image formation may be added between the drying device 1300 and the sheet ejection device 1400.

An example of the pre-processing device performs a processing liquid applying operation to apply processing liquid onto the sheet P so as to reduce bleeding by reacting with ink. However, the content of the pre-processing operation is not limited to any particular processing. Examples of the post-processing device include a sheet reversing-and-conveying process for reversing a sheet on which an image has been formed by the image forming device 1200 and sending the sheet to the image forming device 1200 again to form images on both sides of the sheet, a process for binding a plurality of sheets on which images have been formed, a correction mechanism that corrects sheet deformation, and a cooling mechanism that cools the sheet.

Next, a description is given of a control configuration of an inkjet recording apparatus 1.

Figure 19:
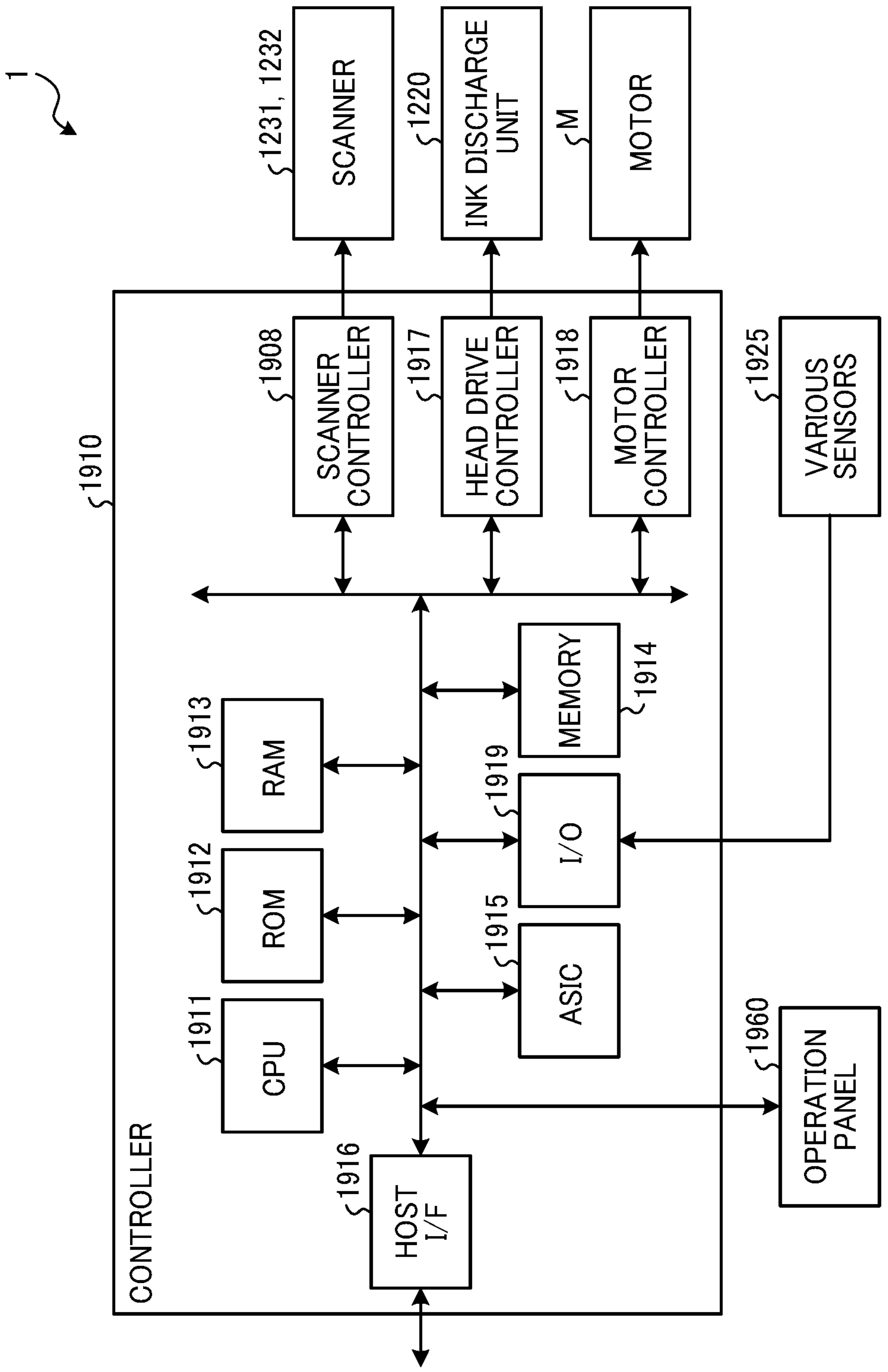
FIG. 19 is a block diagram illustrating a control configuration of the inkjet recording apparatus according to the third embodiment of the present disclosure.

FIG. 19 is a block diagram illustrating a control configuration of an inkjet recording apparatus according to the third embodiment of the present disclosure. As illustrated in FIG. 19, the inkjet recording apparatus 1 includes a controller 1910 that controls the entire apparatus. The controller 1910 includes a central processing unit (CPU) 1911 serving as a main controller, a read only memory (ROM) 1912, a random access memory (RAM) 1913, a memory 1914, and an application specific integrated circuit (ASIC) 1915. The ROM 1912 stores a computer program executed by the CPU 1911 and other fixed data. The RAM 1913 temporarily stores, e.g., image data. The memory 1914 is a rewritable nonvolatile memory for holding data even while a power supply of the inkjet recording apparatus 1000 is cut off. The ASIC 1915 performs various types of signal processing on image data, image processing such as sorting, and other input/output signal processing to control the entire apparatus.

As illustrated in FIG. 19, the controller 1910 includes a host interface (I/F) 1916, a head drive controller 1917, a motor controller 1918, an I/O 1919, and a scanner controller 1908.

The host I/F 1916 according to the present embodiment sends and receives image data (print data) to and from the host device via a cable or a network. Examples of the host device connected to the inkjet recording apparatus 1 include an information processing apparatus such as a personal computer (PC), an image reading apparatus such as an image scanner, and an imaging apparatus such as a digital camera.

The I/O 1919 connects various sensors 1925 such as moisture sensors, temperature sensors, and other sensors. The I/O 1919 inputs detection signals from the various sensors 1925.

The head drive controller 1917 controls to drive the ink discharge device 1220 and includes a data transmitter. More specifically, the head drive controller 1917 transfers the image data as serial data. The head drive controller 1917 generates a transfer clock and a latch signal which are necessary for, e.g., transmission of image data, determination of the transmission, and a drive waveform which is used when droplets are discharged from the ink discharge device 1220. The head drive controller 1917 inputs the generated drive waveform to a drive circuit inside the ink discharge device 1220.

The motor controller 1918 drives a motor M for rotating, e.g., the receiving cylinder 1201, the sheet carrying drum 1210, or the delivery cylinder 1202.

The scanner controller 1908 controls the two scanners 1231 and 1232.

In addition, the controller 1910 is connected to an operation panel 1960 for inputting and displaying information necessary for the inkjet recording apparatus 1.

The controller 1910 comprehensively controls each unit by deploying a computer program read by the CPU 1911 from the ROM 1912 (or memory 1914) to the RAM 1913 to execute the computer program. More specifically, the CPU 1911 reads out the control content set for each print mode from the ROM 1912 (or memory 1914) based on the print mode set from the operation panel 1960. The CPU 1911 controls each unit based on the control content read from the ROM 1912 (or memory 1914), thereby performing the control described below.

The computer program to be executed by the inkjet recording apparatus 1000 according to the present embodiment may be provided to be recorded in any desired computer-readable recording medium such as a compact disc, a compact disc-read only memory (CD-ROM), a flexible disk (FD), a compact disc-recordable (CD-R), and a digital versatile disk (DVD) in a file format installable or executable.

A computer program to be executed by the inkjet recording apparatus 1000 according to the present embodiment may be stored in a computer connected to a network such as the Internet, and may be provided to be downloaded via the network. Such a computer program to be executed by, e.g., the inkjet recording apparatus 1000 according to the present embodiment may be provided or distributed via a network such as the Internet.

The computer program to be executed by the inkjet recording apparatus 1000 according to the present embodiment may be provided by being incorporated in, e.g., a ROM in advance.

In the present embodiment, the controller 1910 functions as an example of the patch-image-data generator 900 and the pattern processing unit 908.

Note that in the present embodiment as described above, the image forming apparatus according to the present disclosure is applied to a multifunction printer or multifunction peripheral (MFP) that has at least two of a photocopying function, a printing function, a scanning function, and a facsimile (FAX) function. However, no limitation is intended thereby, and the image forming apparatus according to the present disclosure may be applied to any image forming apparatus such as a copier, a printer, a scanner, and a facsimile.

Each of the functions of the above-described embodiments may be implemented by one or more processing circuits or circuitry. The "processing circuit" in the present specification includes a central processing unit (CPU) programmed to execute each function by software like a processor implemented by an electronic circuit, and a device such as an application specific integrated circuit (ASIC), a digital signal processor (DSP), a field programmable gate array (FPGA), or a conventional circuit module designed to execute each function described above. For example, the polygon motor controller 406, the writing start position controller 405, the LD controller 301, the synchronous-detection-lighting controller 404, the pixel clock generator 403, and the printer controller 401 can be implemented by one or a plurality of processing circuits. A plurality of controllers may be configured in one processing circuit.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image forming apparatus comprising circuitry configured to;

generate an image pattern in which a plurality of types of patch images are combined, wherein each patch image of the plurality of types of patch images comprises image data, wherein the image data of each patch image comprises a plurality of dots, wherein each dot of the plurality of dots of the image data of each patch image has a value ranging from zero through a maximum value for each of one or more colors, wherein each patch image of the plurality of types of patch images is used to correct or adjust operation of the image forming apparatus; and change a value of one or more dots of the plurality of dots of image data of at least one type of patch image of the plurality of types of patch images to less than a maximum value when the plurality of types of patch images are combined.

2. The image forming apparatus according to claim 1, wherein the image pattern is a combination of patch images of different colors.

3. The image forming apparatus according to claim 1, further comprising:

an optical writing device configured to scan and irradiate an image bearer with a light beam corresponding to the image pattern to form a latent image;

a developing device configured to develop the latent image into a toner image; and a transfer unit configured to transfer the toner image onto a transferor.

4. The image forming apparatus according to claim 3, further comprising a plurality of detection devices configured to detect the toner image, wherein the plurality of detection devices are disposed at three locations in a direction intersecting with a movement direction of the transferor.

5. The image forming apparatus according to claim 4, wherein the plurality of detection devices includes detection devices configured to detect the toner image, and wherein the detection devices are disposed at two locations in both ends of a print medium in a direction intersecting with a conveyance direction of the toner image fixed on the print medium.

6. The image forming apparatus according to claim 5, wherein the transferor includes a first transfer belt and a second transfer belt to contact the first transfer belt, wherein the transfer unit is configured to form the toner image on the first transfer belt and transfer the toner image on the first transfer belt onto the second transfer belt, and wherein the detection devices are configured to detect the toner image on the second transfer belt.

7. An image forming apparatus comprising circuitry configured to;

generate an image pattern in which plurality of types of patch images are combined, wherein each patch image of the plurality of types of patch images comprises image data, wherein the image data of each patch image comprises a plurality of dots, wherein each dot of the plurality of dots of the image data of each patch image has a value corresponding to white or a value corresponding to black, wherein each patch image of the plurality of patch images is used to correct or adjust operation of the image forming apparatus; and reverse black and white of at least one type of patch image of the plurality of types of patch images when the plurality of types of patch images are combined, wherein black and white are reversed by, for each dot of the plurality of dots of the image data of the at least one type of patch image, changing a value corresponding to white to a value corresponding to black and changing a value corresponding to black to a value corresponding to white.

8. The image forming apparatus according to claim 7, wherein the image pattern is a combination of patch images of different colors.

9. The image forming apparatus according to claim 7, further comprising:

an optical writing device configured to scan and irradiate an image bearer with a light beam corresponding to the image pattern to form a latent image;

a developing device configured to develop the latent image into a toner image; and a transfer unit configured to transfer the toner image onto a transferor.

10. The image forming apparatus according to claim 9, further comprising a plurality of detection devices configured to detect the toner image, wherein the plurality of detection devices are disposed at three locations in a direction intersecting with a movement direction of the transferor.

11. The image forming apparatus according to claim 10, wherein the plurality of detection devices includes detection devices configured to detect the toner image, and wherein the detection devices are disposed at two locations in both ends of a print medium in a direction intersecting with a conveyance direction of the toner image fixed on the print medium.

12. The image forming apparatus according to claim 11, wherein the transferor includes a first transfer belt and a second transfer belt to contact the first transfer belt, wherein the transfer unit is configured to form the toner image on the first transfer belt and transfer the toner image on the first transfer belt onto the second transfer belt, and wherein the detection devices are configured to detect the toner image on the second transfer belt.

13. A non-transitory storage medium storing a plurality of instructions which, when executed by one or more processors, cause the processors to execute a method, comprising:

generating an image pattern in which plurality of types of patch images are combined, wherein each patch image of the plurality of types of patch images comprises image data, wherein the image data of each patch image comprises a plurality of dots, wherein each dot of the plurality of dots of the image data of each patch image has a value ranging from zero through a maximum value for each of one or more colors, wherein each patch image of the plurality of patch images is used to correct or adjust operation of the image forming apparatus; and changing a value of one or more dots of the plurality of dots of image data of at least one type of patch image of the plurality of types of patch images to less than a maximum value of the at least one type of patch image when the plurality of types of patch images are combined.

* * * * *